(12) United States Patent
Orcutt et al.

(10) Patent No.: US 9,004,378 B2
(45) Date of Patent: Apr. 14, 2015

(54) SYSTEM AND METHOD FOR LAND APPLICATION OF WASTE FLUIDS

(75) Inventors: Russel Lloyd Orcutt, DeWinton (CA);
Jason Pecht, Lethbridge (CA)

(73) Assignee: Summit Liability Solutions, Inc., Calgary (CA)

( * ) Notice: Subject to any disclaimer, the term of this patent is extended or adjusted under 35 U.S.C. 154(b) by 1169 days.

(21) Appl. No.: 12/958,294

(22) Filed: Dec. 1, 2010

(65) Prior Publication Data

US 2011/0266357 A1 Nov. 3, 2011

Related U.S. Application Data

(60) Provisional application No. 61/330,236, filed on Apr. 30, 2010.

(30) Foreign Application Priority Data

Dec. 1, 2010 (CA) .................................. 2722369

(51) Int. Cl.
*A01B 79/00* (2006.01)
*A01C 23/00* (2006.01)

(52) U.S. Cl.
CPC ............ *A01B 79/005* (2013.01); *A01C 23/001* (2013.01)

(58) Field of Classification Search
CPC ........................... A01B 79/005; A01C 23/001
USPC ................... 239/146–176, 722–754
See application file for complete search history.

(56) References Cited

U.S. PATENT DOCUMENTS

| 3,782,634 | A | | 1/1974 | Herman | |
|---|---|---|---|---|---|
| 3,877,645 | A | | 4/1975 | Oligschlaeger | |
| 4,315,317 | A | | 2/1982 | Orchard et al. | |
| 5,475,614 | A | | 12/1995 | Tofte et al. | |
| 5,528,949 | A | | 6/1996 | Stainton et al. | |
| 5,653,389 | A | * | 8/1997 | Henderson et al. | 239/69 |
| 6,122,581 | A | * | 9/2000 | McQuinn | 701/50 |
| 2004/0124260 | A1 | * | 7/2004 | Ward et al. | 239/146 |
| 2010/0301134 | A1 | * | 12/2010 | Anderton et al. | 239/172 |
| 2011/0270495 | A1 | * | 11/2011 | Knapp | 701/50 |

OTHER PUBLICATIONS

PCT Search Report for corresponding application PCT/CA2010/001884, dated Mar. 1, 2011.

* cited by examiner

*Primary Examiner* — Justin Jonaitis
(74) *Attorney, Agent, or Firm* — Sean W Goodwin

(57) ABSTRACT

A system and method are provided for automated control of application of fluid to a surface. A surface map is annotated with shapes designating zones for spraying, and excluding others. A control system in a vehicle uses the annotated map and GPS to assist the operator of the vehicle avoid spraying on excluded zones, and provides a record of the spraying operation including locations sprayed and fluid spray rates. The control system operates valves to control spraying from a container on the vehicle, based on several parameters, so as to avoid spraying excluded zones and steep slopes, to avoid overlaps, and to limit fluid spray rates below pre-determined maximums. The system further assists the operator by providing a visual guide on a display. A kit can be provided to retrofit a vehicle for landspraying.

35 Claims, 11 Drawing Sheets
(2 of 11 Drawing Sheet(s) Filed in Color)

| N Latitude | W Longitude |
|---|---|
| XX.MMM 6725 | -YYY.MMM 7132 |
| XX.MMM 6732 | -YYY.MMM 7235 |
| XX.MMM 6733 | -YYY.MMM 7471 |
| XX.MMM 6737 | -YYY.MMM 7883 |
| XX.MMM 6736 | -YYY.MMM 9103 |
| XX.MMM 6741 | -YYY.MM 10230 |
| XX.MMM 6744 | -YYY.MM 11309 |
| XX.MMM 7958 | -YYY.MM 11299 |
| XX.MMM 7955 | -YYY.MM 10222 |
| XX.MMM 7950 | -YYY.MMM 9091 |
| XX.MMM 7951 | -YYY.MMM 7879 |
| XX.MMM 7947 | -YYY.MMM 7463 |
| XX.MMM 7946 | -YYY.MMM 7227 |
| XX.MMM 7939 | -YYY.MMM 7112 |
| XX.MMM 6725 | -YYY.MMM 7132 |

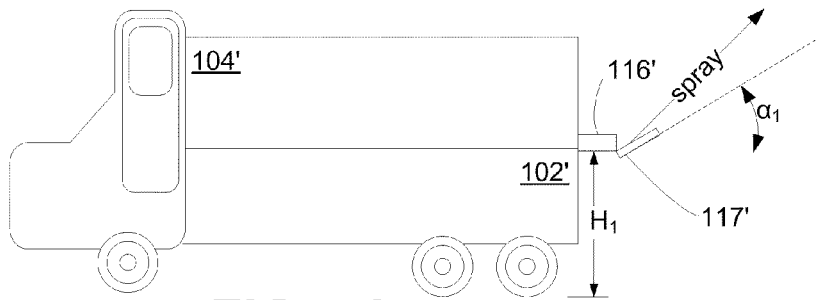
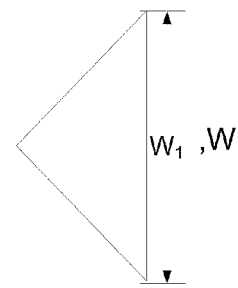
FIG. 7A  FIG. 7E
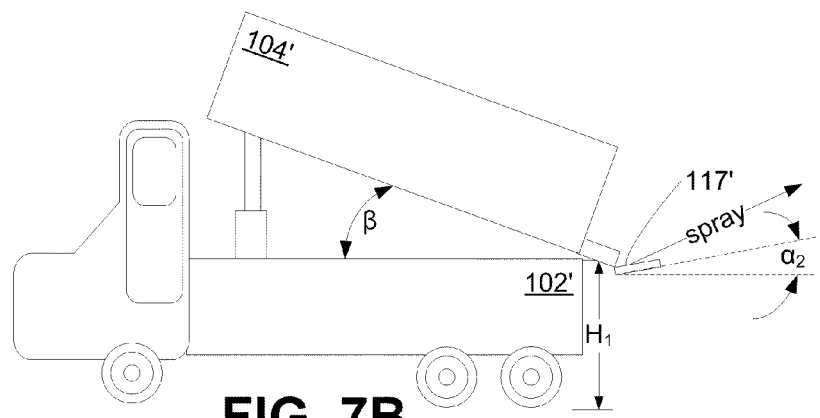
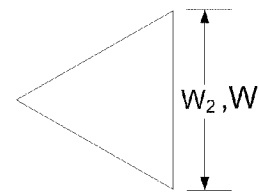
FIG. 7B  FIG. 7F
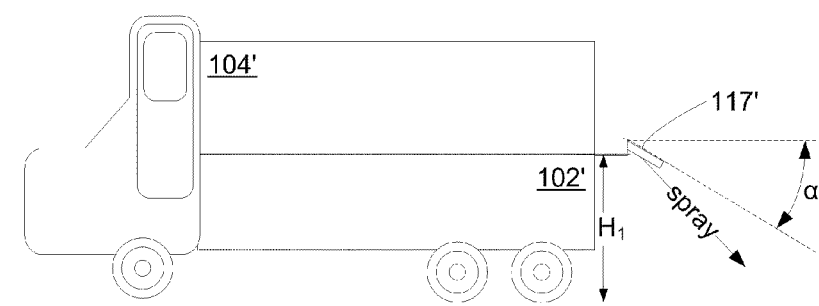
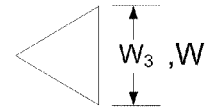
FIG. 7C  FIG. 7G
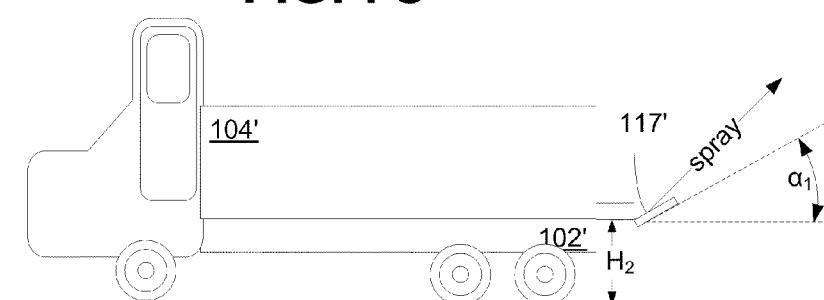
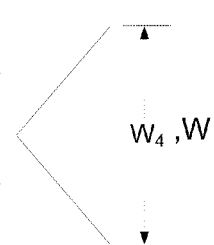
FIG. 7D  FIG. 7H

SYSTEM AND METHOD FOR LAND APPLICATION OF WASTE FLUIDS

CROSS-REFERENCE TO RELATED APPLICATIONS

This application claims the benefit of U.S. Provisional Application No. 61/330,236, filed Apr. 30, 2010.

FIELD OF THE INVENTION

The present invention relates to techniques for land application of waste streams generally and more particularly to controlling and monitoring the disposal or landspraying of drilling waste to comply with applicable government regulations.

BACKGROUND OF THE INVENTION

Drilling wells for oil and gas exploration invariably produces waste material. The drilling process typically involves the use rotary drill bits that are lubricated by drilling fluids sometimes called mud. As the drill bit grinds downward through soil and rock formation, large amounts of ground-up materials called drill cuttings and drilling fluids are generated, requiring environmentally safe disposal.

Many methods exist for disposing drill waste. These include on-site disposal methods, off-site disposal methods, land-treatment methods and other alternatives. Two of the well known methods for disposing of water-based drilling waste off-site are "land spraying" and "land spraying while drilling". In the present document, "land spraying", and "land spraying while drilling", may be referred to individually and collectively as "landspraying". Under suitable conditions, drill waste can be safely and beneficially sprayed over agricultural land.

However, excessive amounts of drill waste disposed within a given area of land, may lead to undesirable environmental side effects. Not surprisingly, governments at provincial/state and federal levels have instituted strict regulations regarding drill waste disposal methods. Compliance with the regulations requires tight control over where the drill waste fluid is sprayed and the amount of fluid sprayed over a given area.

Care must be taken to avoid spraying on sensitive areas such as bodies of water, steep hills, bales of hay, physical structures and the like. In addition one attempts to limit the amount of waste deposited in any given unit of area to safe amounts. What is deemed safe can be based on the chemical properties of the waste fluid.

Current conventional methods require a technician to physically scout and review the land. The technician calculates the total land area required for disposal based on the volume and chemical properties of drill waste fluid. The technician assesses the suitability of the land by taking representative soil samples to establish baseline soil chemistry of zones to be sprayed. The technician excludes areas that have high slopes, bodies of water, and other zones made unsuitable for spraying by seasonal factors.

After the boundaries of zones to be sprayed are determined, the operator of a truck loaded with drill waste fluid, is provided with information regarding approved zones to be sprayed, and the excluded areas.

The operator of the truck must either visually inspect the land being sprayed, or remain in communication with a technician, to avoid spraying outside the approved marked zones. It should be noted that the technician is not on-site during the entirety of each spraying operation, and thus the operator of the truck is responsible for spraying only on approved zones.

Drilling mud is a difficult fluid to handle. Drill cuttings in the fluid make it difficult to exercise flow control, other than fully opening to allow fluid discharge or fully closing to disallow fluid discharge. Often, vacuum trucks or similarly equipped vehicles, are used for landspraying. After the vacuum system is pressurized, the spraying operation is started and stopped manually using a simple valve operated by the truck operator depending on the location of the truck relative to zones designated for spraying. After disposal, manual mapping of the sprayed areas is performed for reporting purposes to comply with regulations.

There are many problems with these current conventional practices. During winter months, the technician scouting the land is often hampered by snow and uses, at best, dated aerial photographs for assessment. Further, post spraying mapping may be impaired by rain, snow and agricultural activities, which may lead to inaccuracies in the reported data. Trucks that discharge the drill waste fluid have no engineered environmental safeguards in place to ensure regulatory compliance. Accordingly, the onus is on the truck operator to perform landspraying in a compliant manner, relying largely on visual inspection, during good or poor weather, daytime and night conditions. As the truck operator is often among the least trained persons with regard to regulatory compliance requirements, reliance on the operator entails a high risk of non-compliance as a result of human error, weather conditions, poor visibility and the like.

Systems and methods for dispensing fluids on agricultural land are known. U.S. Pat. No. 7,370,589 to Wilkerson et al. for example, discloses a fluid dispenser aimed at improving in-furrow chemical application. The dispenser is operable to dispense fluid at a second location, after detecting that an object has passed a first location. Such known systems however, are aimed at improving efficiency and do not provide adequate safeguards to avoid overlap of zones on which fluids are dispensed, and require physical marker objects to be present on the target surface prior to applying the fluid. The requirement for physical markings may be costly and may limit available candidate land surfaces for landspraying. Moreover, the operation of known systems and methods does not take the slope of the terrain into account, which is a limiting factor for suitability for landspraying.

Accordingly, a system and method is needed to overcome the deficiencies of the conventional landspraying methods for drill waste disposal namely to better manage compliance with regulations for controlled placement, concerning where sprayed and amount sprayed.

SUMMARY OF THE INVENTION

Apparatus and method are provided for controlled spraying of a surface with fluid from a mobile container. Spraying is controlled to avoid exclusion zones, such as boundaries, hazards and environmentally sensitive areas. A vehicle, such as a vacuum truck, supports and transports the container. A navigation unit determines a current position of the vehicle and a speed indicator determines a speed of the vehicle. A valve-operated spray nozzle is mounted on the container for controllably delivering fluid to the spray nozzle. A control unit determines spatial coordinates of the surface including boundary coordinates defining one or more exclusion zones on the surface which are not to be sprayed. The control units determines a current position of the vehicle, and conditions including whether the current position is outside the exclusion zones; and a minimum speed $V_{min}$ for the vehicle for spraying an areal spray rate less than a predetermined maximum spray rate RMAX. If the conditions are satisfied, the controller automatically signals an actuator interconnected to the valve for controllably delivering spray fluid.

The apparatus enables practising of a method comprising obtaining a plurality of spatial coordinates for the surface and establishing boundary coordinates defining one or more exclusion zones on the surface which are not to be sprayed. One traverses at least a portion of the surface with the container along a path, the container having a spray nozzle for controllably delivering a spray width W of fluid at an areal spray rate R (volume/area) to the surface along the path For each current position of the container along the path, the method further comprises obtaining position coordinates; determining the areal spray rate R; and automatically spraying the spray width W at a sprayed position along the path with the fluid from the container, if the following spray conditions are met, including the spray width is outside the exclusion zones, and the areal spray rate R is less than a predetermined maximum spray rate RMAX.

While entire systems can be provided, vehicles can be retrofitted for automatic control of landspraying including provision of a kit to supply that which is not already on such as vehicle. A kit might include an actuator assembly a navigation unit, a control unit comprising: a processor in communication with memory, a control unit comprising a processor in communication with the navigation unit, the actuator; and memory storing processor-executable instructions adapting the control unit to assess the aforementioned spray conditions and spray accordingly. The kit may also include an actuator assembly to manipulate the discharge valve, a pneumatic cylinder connected to the valve and a solenoid-piloted pneumatic actuator for alternating control between the control unit and manual control.

Use of various of the embodiments disclosed herein will better effect compliance and costs associated therewith including avoiding spraying: in the wrong field, outside the appropriate area; in unacceptable proximity to identified water bodies and identified pipelines. Further, one avoids use of improper sloped terrain, overflow and excessive spray rates, and overlap of spraying. The disclosed embodiments control liquid discharge in accordance with assessed rules that ensure the above risks are eliminated. Further, using the annotated display provides the driver or operator with a form of night vision and steering assistance for field navigation and aesthetics. The drivers can focus on driving versus assessing fields and compliance matters. High mapping accuracy results and technicians can be more efficient, with more time focused on quality assessments and details.

BRIEF DESCRIPTION OF THE DRAWINGS

The patent or application file contains at least one drawing executed in color. Copies of this patent or patent application with color drawing(s) will be provided by the Office upon request and payment of the necessary fee.

FIGS. 7A-7D are schematic side views of a vehicle, depicting possible orientations for its container and spray plate;

FIGS. 7E-7H are schematic plan views of the spray corresponding to the container and spray plate orientations depicted in FIGS. 7A-7D respectively;

DETAILED DESCRIPTION OF EMBODIMENTS

A system and control unit provide automated control and monitoring system for maximizing regulatory compliance in landspraying operations. While described herein in the context of landspraying of waste fluids such as drilling fluid, the apparatus and methods herein can be applied to the controlled deposition of other materials and waste fluids.

The control unit is typically installed in a vehicle having a fluid container mounted thereon. The container has a valve, operable by the control unit, to regulate discharge of waste fluid typically containing solid particle debris. The control unit obtains coordinate data for land surface to be sprayed, including boundaries of exclusion zones on the surface that should not be sprayed. The control unit then employs a navigation system and valve control to avoid spraying within the exclusion zones, to avoid overspraying in approved zones and to capture the exact mapping of deposited material for analysis and reporting.

The control unit operates the valve to spray the waste fluid based on safety and environmental regulatory criteria. The control unit makes use of various parameters to evaluate if compliance criteria are met before initiating spraying of the waste fluid. The criteria are selected to avoid spraying on sensitive zones such as bodies of water and, when spraying in approved zones, to limit areal spray rate, i.e., the volume of fluid sprayed per unit area of surface. The system assists the operator of the vehicle by providing automated spraying control, and can further provide visual guides, and automated steering for the vehicle as needed.

A management system, including application software, may be used to assist in identifying the boundaries for zones within the land surface that should not be sprayed. The application software may be used to select a map of the land surface from a database of maps or photographic/satellite images containing coordinate data. Application software may then be used to annotate the selected map with polygons or other shapes distinguishing boundaries of exclusion zones not to be sprayed. The annotated map is then provided to the control unit. The overall area of the land surface to be sprayed, less the exclusion zones provides a rough net area available for spraying.

Figure 1:
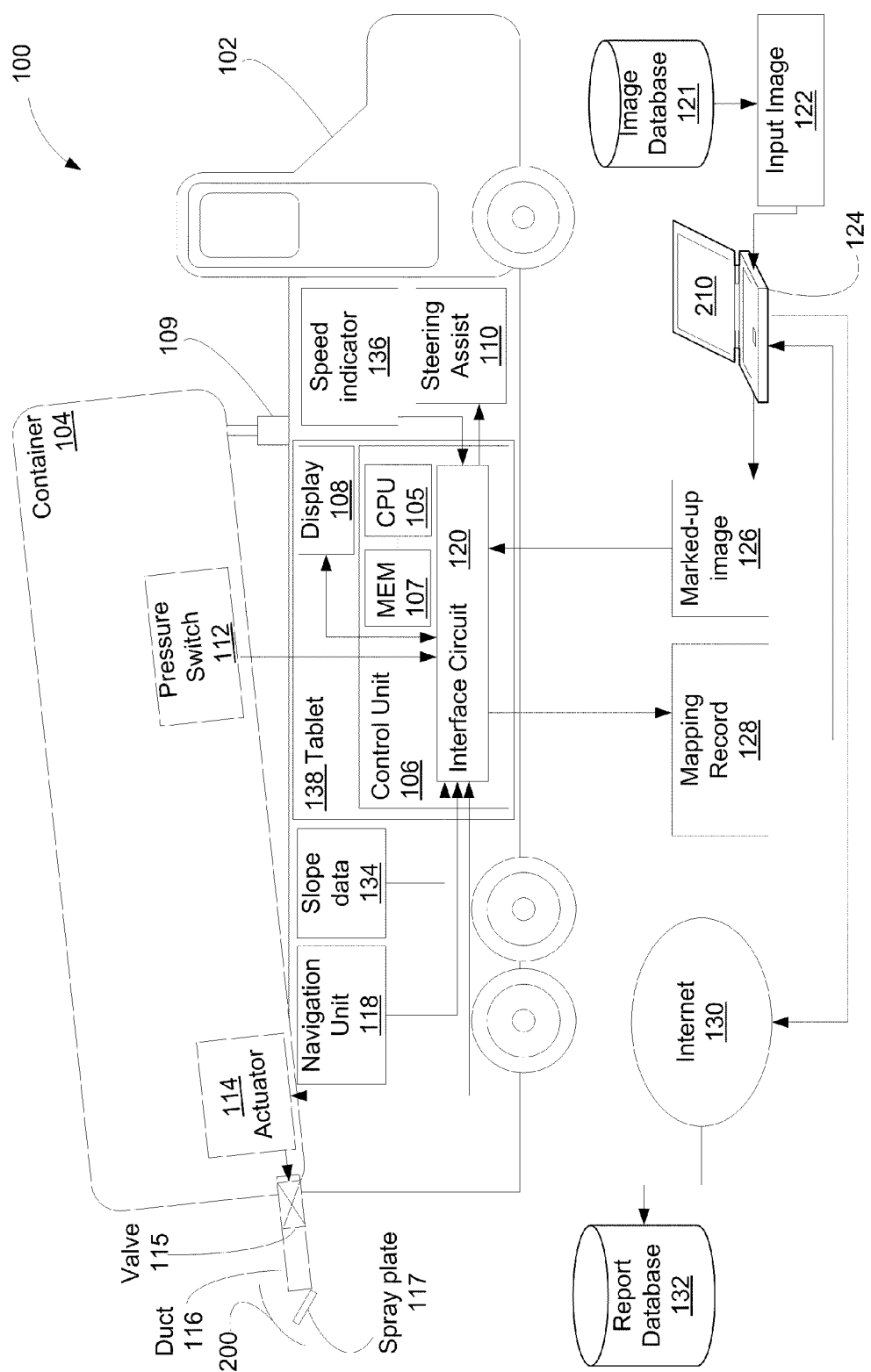
FIG. 1 is a schematic diagram of an embodiment of a system for landspraying, depicting a vehicle with a control unit for operating a container mounted thereon.

Accordingly, and with reference to FIG. 1, one embodiment of a land spraying system 100 is provided for use in drill waste fluid disposal. The land spraying system 100 comprises a vehicle 102, a fluid container 104 mounted thereon, a control unit 106 and peripherals described later which support operations. An onsite or offsite surface pre-spray and post-spray management system 210 enables surface selection, zone determination and post-spraying reporting functions.

The fluid-handling apparatus comprises the vehicle 102, container 104, and fluid discharge equipment including discharge valve 115, valve actuator 114 and nozzle 200. The container 104 can be a standard tank suitable for transporting liquids. The container 104 is fit with a fluid discharge or duct 116 adjacent its base. The container 104 is filled with the waste fluid and may be pressurized with an air pad to aid in the discharge of the waste fluid through duct 116. As the fluid level in the container 104 drops, the hydrostatic head also drops and the flow rate diminishes. Due to variable hydraulic head of the waste fluid, the flow rate or discharge rate can vary, being maximum when the container 104 is full and the fluid hydrostatic head is additive in the container pressure. The variability in hydrostatic head is somewhat lessened by the use of the air padding over the waste liquid.

A hydraulic mechanism 109 in the vehicle 102 may be used to tilt the container 104 for maximal discharge of fluid through duct 116. A relief valve may be present in the container 104 to protect against excessive pressure build up. In one specific embodiment, a Kunkle relief valve supplied by Tyco International Ltd of Princeton, N.J., USA may be used.

Nozzle 200 is formed by the discharge opening of the duct 116 and a spray plate 117 to disperse the fluid in a fan pattern (See also FIGS. 7A and 7E). A typical discharge opening of the duct 116 for a vacuum truck is about 4 inches in diameter. The sprayed fluid thus lands onto the surface below having a spray width W. As the vehicle 102 traverses the land surface, the spray width W and a traversed distance over the surface establishes the sprayed area over time.

An on-off discharge valve 115 in the duct 114 controls the flow of fluid from the container 104 to the nozzle 200. Waste fluids have characteristics which interfere with fine variable flow control. Thus, on-off valves are used as they mitigate intermittent blockages in the duct 116 that can occur with variable flow control valves. Periodic blockages are undesirable as they can lead to unpredictable drought and flood discharge. While crude, the controlled discharge of a on/off valve is predictable and step-wise controllable. The valve 115 can have a fail-safe, closed mode.

An actuator 114 may be used to actuate the on-off valve 115. The actuator 114 may include one or more pneumatic/hydraulic actuators and cylinders controlled by a solenoid, as will detailed later. The actuator 114 may be triggered by a control signal to the solenoid.

A pressure switch 112 may be used to monitor air pressure in the container 104 and to provide a signal when the container 104 is empty or very nearly empty. Alternatively, a pressure switch might be used to measure liquid pressure with corresponding changes in setpoints for assessing liquid conditions. In one specific embodiment, the pressure switch 112 may be an Ashcroft B-Series general purpose pressure switch provided by Ashcroft Inc, of Stratford, Conn., USA. Pressure switches are more suitable than alternatives such as load sensors, due to reduced costs and relative immunity to sediment build-up in the container 104. Further, the pressure switch 112 can be used to monitor pressure variations to ensure rate compliance, as variations in pressure, or without applied air pressure, the pattern is poor and over-spraying could occur.

The vehicle 102 further includes position and automation controls comprising a human interface device or tablet 138, and inputs including a navigation unit 118, a speed indicator 136, pressure switch 112 and a slope measurement unit 134. The tablet 138 includes a control unit 106 for managing inputs and controlling landspraying operations including actuation of the valve 115 and even steering assist 110.

The navigation unit 118 may be a global positioning system (GPS) device, a differential GPS (DGPS) device, a precision GPS (PGPS) device or a similar navigation unit having a corresponding antenna. The speed indicator 136 may be part of the navigation unit 118 or a separate dedicated speedometer with a digital input-output (I/O) interface.

The slope measurement unit 134 may be an inertial measurement device that provides independent measurements of both the roll and the pitch for vehicles. Accordingly, the slope measurement unit 134 may include accelerometers and gyroscopes coupled to a digital signal processor with appropriate I/O interfaces. Digital signal processing algorithms may be used to identify and smooth out minor bumps and depressions from genuine underlying slopes of land surfaces using digital filtering and the like. In other embodiments, measurement unit 134 may alternately be implemented as a modified steering-assist unit, as will be detailed later.

The tablet 138 comprises the control unit 106 and a display 108. The control unit 106 provides automated control of the spraying operation. The control unit 106 may include a general purpose processor 105 interconnected to a block of memory 107 and an interface circuit 120. The memory 107 may include volatile and non-volatile parts that store processor-executable instructions for execution by the processor 105. The stored instructions may, in some embodiments, include instructions for implementing parts of the navigation unit 118. The display 108 is interconnected with the control unit 106. The display 108 may be a touch screen that allows touch based user inputs in addition to its visual display functions. Alternately, a separate keyboard or keypad (not shown) interconnected to control unit 106 may be used for data entry. The tablet 138 can be a hardware unit such as a computer, handheld device, a laptop computer. The tablet may also physically house both the display 108 and components of the control unit 106.

The control unit 106 may further interconnect the steering-assist unit 110, the navigation unit 118, the slope measurement unit 134, the speed indicator 136, and the actuator 114. The control unit 106 interconnects to the solenoid in actuator 114. The control unit 106 can thus automatically open and close valve 115 via actuator 114 by transmitting an electrical signal to the solenoid.

The interface circuit 120 of the control unit 106 may include various specific hardware interfaces for receiving and outputting digital and analog signals. The interfaces may provide specific interconnections to the display 108, the steering-assist unit 110, the navigation unit 118, the actuator 114, the pressure switch 112, the speed indicator 136 and the like. The interface circuit 120 may further include USB interfaces, a wireless interface (such as WiFi or Bluetooth) and other input-output (I/O) interfaces.

The control unit 106 is able to receive data from and send data to the various components of the land spraying system 100 interconnected with it. This allows the control unit 106 to perform various monitoring and control functions. For example, the control unit 106 can determine if the container 104 is empty such as by comparing pressure data from the pressure switch 112 with a predefined minimum pressure. The control unit 106 can determine the speed (or velocity) of the vehicle 102 by receiving data from the speed indicator 136 or navigation unit 118. The control unit 106 may determine its current location by receiving current location coordinates from the navigation unit 118, and may determine the slope at the current location using data from the slope measurement unit 134. Further, as will be detailed later, the control unit can open and close the valve 115 by signalling the solenoid in the actuator 114.

The system 100 further includes management system 210, which can comprise a computing device 124 which may be any one of the commonly available personal computers or workstations having a processor, volatile and non-volatile memory, and an interface circuit for interconnection to one or more peripheral devices for data input and output. Processor-executable instructions, in the form of application software, may be loaded into the memory in computing device 124 to adapt its processor to read an input map 122, to process the map including the overlaying of exclusion shapes and zones, and to output an annotated coordinate map 126. The input map 122 is typically a satellite image, an aerial photograph, a topographical map or the like. Exclusion shapes can be defined by vector graphics and the like, including simple geometric shapes like circles or polygonal representations.

A detailed record of spraying operation by vehicle 102 may be kept by the control unit 106 as a data file 128 for export to and processing by the computing device 124 of the management system 210 and subsequent transmission to a designated reporting database 132 by way of a wide area network 130 such as the Internet. The recorded mapping data can be used to avoid overlaps and may be used to compile formal reports for regulatory compliance and/or for custom internal record keeping.

Figure 2:
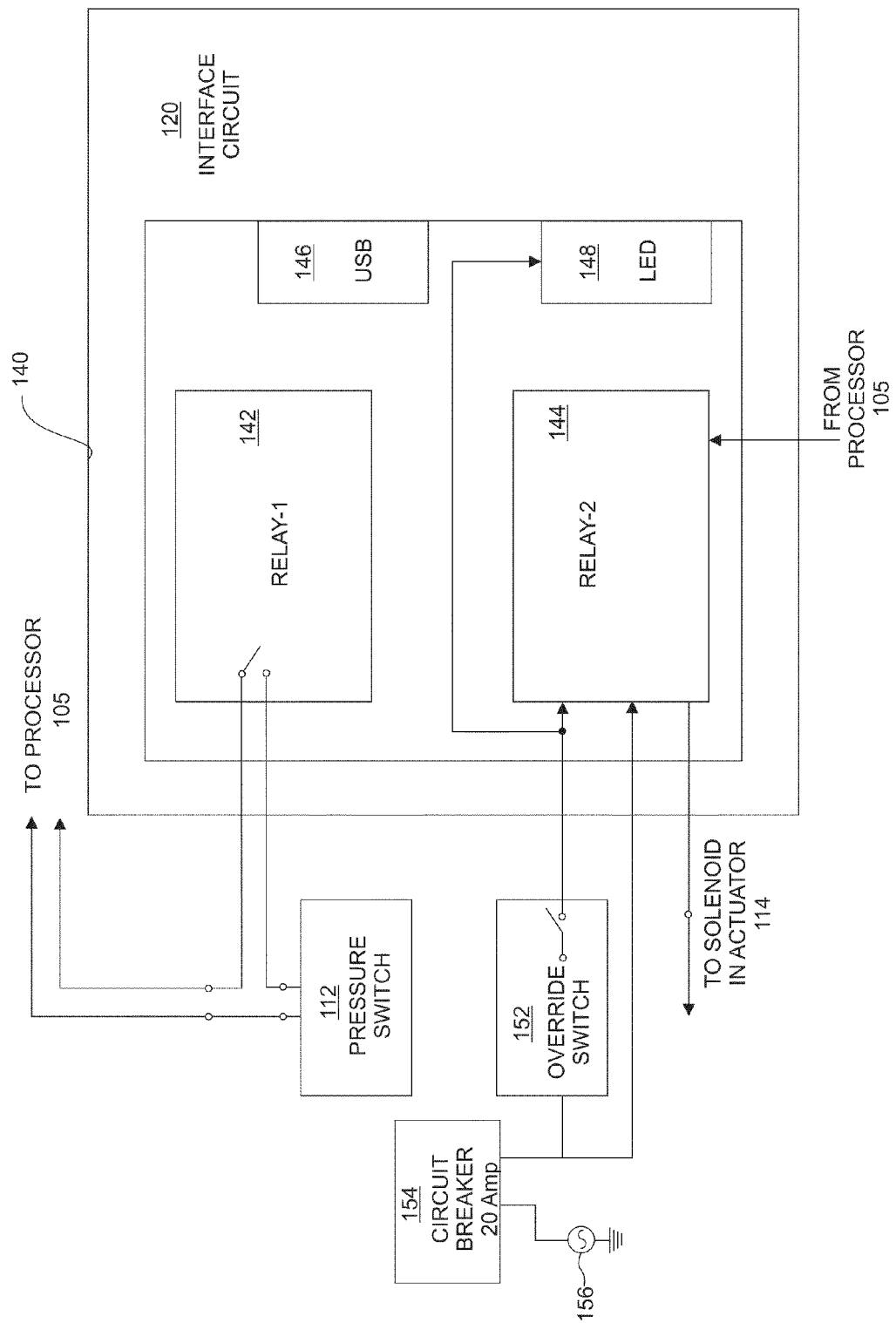
FIG. 2 is a schematic block diagram of one embodiment of a relay board forming part of the interface circuit in the control unit of FIG. 1.

Turning to FIG. 2, an embodiment of an interface circuit 120 between the control unit 106 and the peripherals includes interconnections to one or more USB devices. The interface circuit 120 may include a relay board 140 similar to a JSB-252 USB relay board from J-Works Inc., of Granada Hills, Calif., USA. The relay board 140 may be housed in a separate enclosure. The relay board 140 may have a first relay 142 interconnecting the pressure switch 112 and the processor 105 of control unit 106; and a second relay 144 interconnecting the actuator 114 to an override switch 152. The override switch may be a two position, keyed switch.

A circuit breaker 154 may be used to limit current into relay 144 from a power supply 156. The relay board 140 may also include a USB port 146 to allow a host controller such as processor 105 to perform host control functions, via standard programming languages. The relay board 140 may further include one or more LED indicators 148 to provide status information.

In one embodiment, the first relay 142 relays an electrical signal from the pressure switch 112 to processor 105 whenever the pressure inside container 104 has fallen below a specified threshold, indicating that container 104 may be approaching empty. This allows processor 105 to determine that actual spraying has effectively stopped and thus close the valve 115.

A factor in determining the minimum velocity of the vehicle is based upon specific spray pattern expectations, those spray patterns being affected by the pressure in the tank. Thus, in another embodiment, the first relay 142 relays an electrical signal from the pressure switch 112 to processor 105 to keep valve 115 from opening until a suitable pressure has been created in the tank to ensure complaint spray patterns and prevent overspray.

The second relay 144 may be used to override the signal from processor 105 and to open or close the valve 115 via the solenoid in actuator 114. Of course many alternative implementations for overriding a control signals and for communicating status information will be known to those of ordinary skill in the art.

With reference to FIGS. 3A through 3D, an otherwise conventional vacuum truck can be retrofitted for automated landspraying, yet convertible back to conventional uses thereafter. If convertibility is not employed, air and electrical controls would be simplified.

Simply, on/off control of the valve 115 is placed under automated control or manual control. In one mode, the actuator 114 enables the control unit 106 to open and close the valve 115 under automated control for use in landspraying. In a second mode, the control unit 106 is bypassed, such as via keyed bypass switch 152, and the valve 115 is actuated by some other means, such as by direct operator manual control, not related to landspraying use as contemplated herein.

Figure 3A:
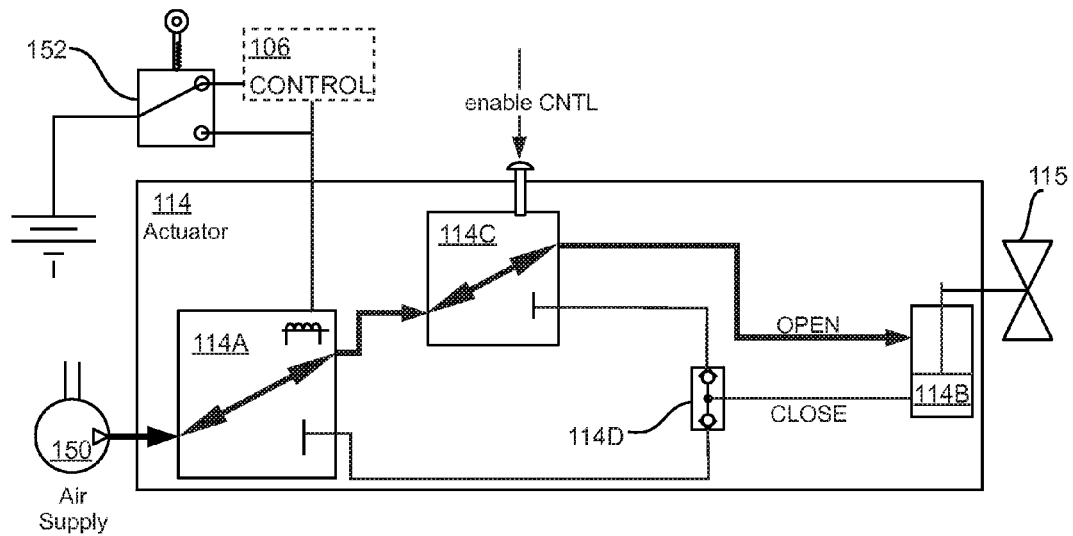
FIGS. 3A-3D are schematic block diagrams of one embodiment of the valve actuator of FIG. 1 illustrating controlled valve operation and operations with control bypassed for manual operation.
Figure 3B:
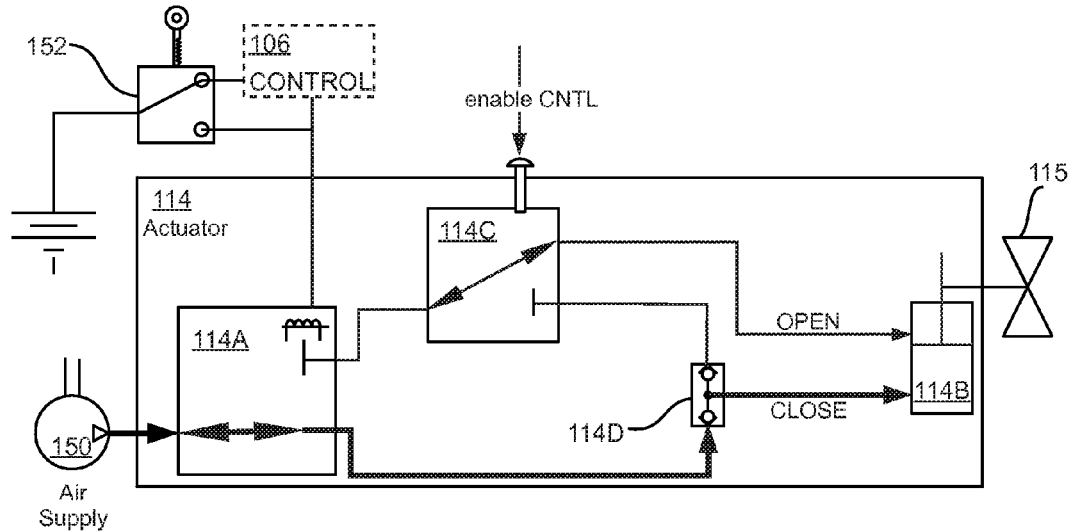

FIGS. 3A and 3B depict one such embodiment of the actuator 114. As shown, the actuator 114 may include a pneumatic-actuated, double-acting cylinder 114B, for manipulating the valve 115, and a spread valve such as an air toggle switch 114C. The switch 114C may be that already available as part of the unmodified vehicle 102, or provided anew as part of this embodiment. For automation, a solenoid-piloted actuator 114A and a shuttle valve 114D are incorporated with the switch 114C and cylinder 114B. An air supply unit 150 such as an air compressor provides compressed air for use by the actuator 114. The cylinder 114B is mechanically coupled to the discharge valve 115. Power is provided for operating electrical components including the solenoid-piloted actuator 114A. A suitable solenoid-piloted actuator 114A is model MAC series 800 by MAC valves Inc., Michigan, US.

With the bypass switch 152 off, the control unit 106 is in control of the solenoid-piloted actuator 114A. When the air toggle switch 114C is open, automated control is enabled. Simply, the control unit 106 controls solenoid-piloted actuator 114A to alternate between directing air through air toggle switch 114C to open the valve 115 (FIG. 3A) and directing air through a closing bypass line to bypass the air toggle switch 114C and close the valve 115 (FIG. 3B). A shuttle valve 114D isolates the air toggle switch 114C from the closing bypass line. In this convertible embodiment, the air toggle switch 114C is a manual spread valve which is always available to manually close the valve 115. In automated control mode, the air toggle switch 114C is left in the open position and control unit 106 can open and close the valve 115 with the air toggle switch 114C in the open position.

As shown in FIG. 3A, the control unit 106 can open and close the valve 115 by sending a signal to the solenoid-piloted actuator 114A. A first output of the air toggle switch 114C connects to a first port the cylinder 114B. A second output port of the air toggle switch 114C connects to the shuttle valve 114D. The shuttle valve 114D interconnects the switch 114C with a second port of the cylinder 114B. With the toggle switch 114C is one or open, air is directed from its input to its first output. Conversely, when the toggle switch 114C is off or closed, the first output is blocked and a second output is opened for manual closing of the valve 115. Toggle switch 114C can thus be used to override control unit 106 and close the valve 115.

The solenoid-piloted actuator 114A has at least one input and two output ports. The air supply unit 150 is connected to the input of actuator 114A and the first output of actuator 114A is connected to an input of the toggle switch 114C. The second output of actuator 114A is connected to another input of the shuttle valve 114D. Electrical input to the actuator 114A alternates directing air from the input port to the first output port to supply switch 114C, and from the input port to the second output connected to the shuttle valve 114D. Not shown in the general schematics of FIGS. 3A to 3D, the solenoid in actuator 114A may be electrically wired through relay board 140 of FIG. 2.

The cylinder 114B is typically a double-acting cylinder having a piston that moves between two positions, the piston being mechanically coupled to valve 115 which is fully open in a first position and fully closed in a second position. Air flow into the first input of cylinder 114B moves the piston to an open position thereby opening the coupled valve 115. Conversely, air flow into the second input of cylinder 114B retracts the piston back to the closed position, thereby closing the coupled valve 115. In alternate embodiments, the cylinder 114B may be single-acting cylinder having a normally-closed position, spring-biased return. Venting of the opposing cylinder inputs is not detailed.

Figure 3C:
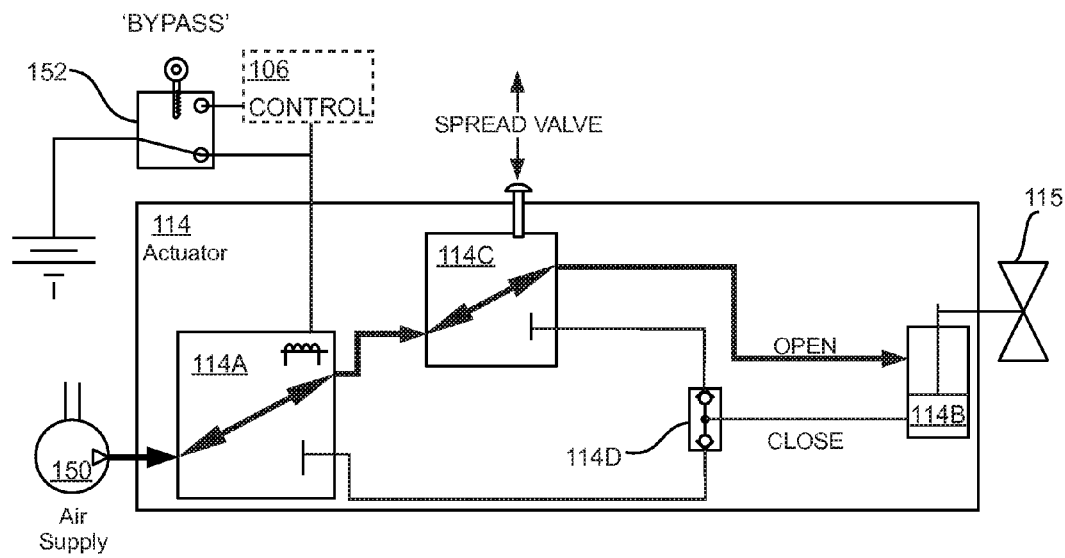

Actual air flow within the actuator 114 is depicted by the thick solid lines in FIGS. 3A-3C. The direction of air flow is indicated by arrows.

In FIG. 3A, the toggle switch 114C is switched on (set to an open or enable position) to enable the control unit 106 to operate valve 115. The control unit 106 signals the actuator 114A to open the valve 115. Accordingly air flows through the first output of the actuator 114A and moves the piston in the cylinder 114B to the open position, thereby opening valve 115. Piston extension and retraction functions may be reversed depending on the mechanical coupling of the valve 155 and cylinder 114B. Typical of double-acting cylinders, extension typically has greater actuating force than retraction and thus one might arrange the cylinder accordingly to advantage.

In FIG. 3B, while the toggle switch 114C remains on or open, the control unit 106 signals the solenoid-piloted actuator 114A to close the valve 115. Accordingly air now leaves from the second output of the actuator 114A, through the shuttle valve 114D, and moves the piston in the cylinder 114B to the closed position, thereby closing valve 115. It is clear from FIGS. 3A-3B, that while toggle switch 114C remains open, the control unit 106 is able to automatically operate the valve 115 via the solenoid-piloted actuator 114A and the cylinder 114B.

Figure 3D:
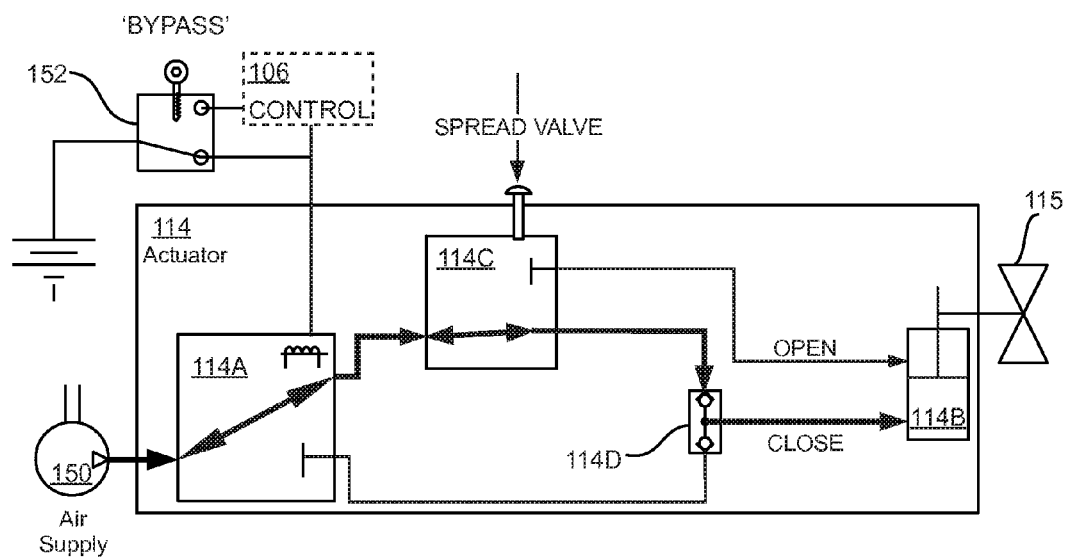

As discussed, the vehicle 102 can be converted to normal operation without having to remove the retrofit components. As shown in FIGS. 3C and 3D, the keyed bypass 152 can be set to disable control unit 106 communication with the solenoid-piloted actuator 114A and instead continuously powers actuator 114A. Accordingly air is continuously directed to toggle switch 114C.

As shown in FIG. 3C, with toggle switch 114C switched on or open, air is directed to open cylinder 114B. As shown in FIG. 3D however, with toggle switch 114C switched off or closed, air is directed through shuttle valve 114D to close cylinder 114B.

As discussed above, the actuator 114 can be used to selectively operate an appropriately equipped vacuum truck either normally via toggle switch 114C or using the control unit 106.

Availability of a bypass could result in inappropriate use. Thus a bypass lockout can be provided. Lockout tags also avoid the overhead associated with issuance and tracking of keys for a keyed bypass. While a keyed bypass can still be used with a lockout tag, a bypass switch also be provided without individual keys and instead lockout tags are used to irreversibly indicate actuation or use of the bypass. The lockout tag can further list appropriate contacts or phone numbers as well as additional contacts for the current technician applied thereon when installing the tag. When the technician arms the system for controlled spraying the lockout tag is installed in such a manner that to disarm would require breaking the tag. This allows for no interruption to a landspraying consultant, can be bypassed without keys, and forces the operator to break a seal to bypass which should encourage the operator to call the contact numbers before bypassing or at least afterwards. Further, regardless of contact, there is evidence the bypass was used.

A person of ordinary skill in the art will readily appreciate that numerous other alternative implementations for the actuator 114 may be used in alternate embodiments of the present invention.

Map Annotation

With reference to FIG. 1, in preparation, an input image or map 122, which corresponds to a land surface to be sprayed with drill waste fluid, may be chosen from an image database 121 of candidate maps. Application software forming part of computing device 124 may be used to retrieve the maps and select a suitable input map 122. The maps in the database 121 may be in the form of satellite images, topographic maps, aerial photographs, or other digital representations of geographical coordinate data.

Figure 6:
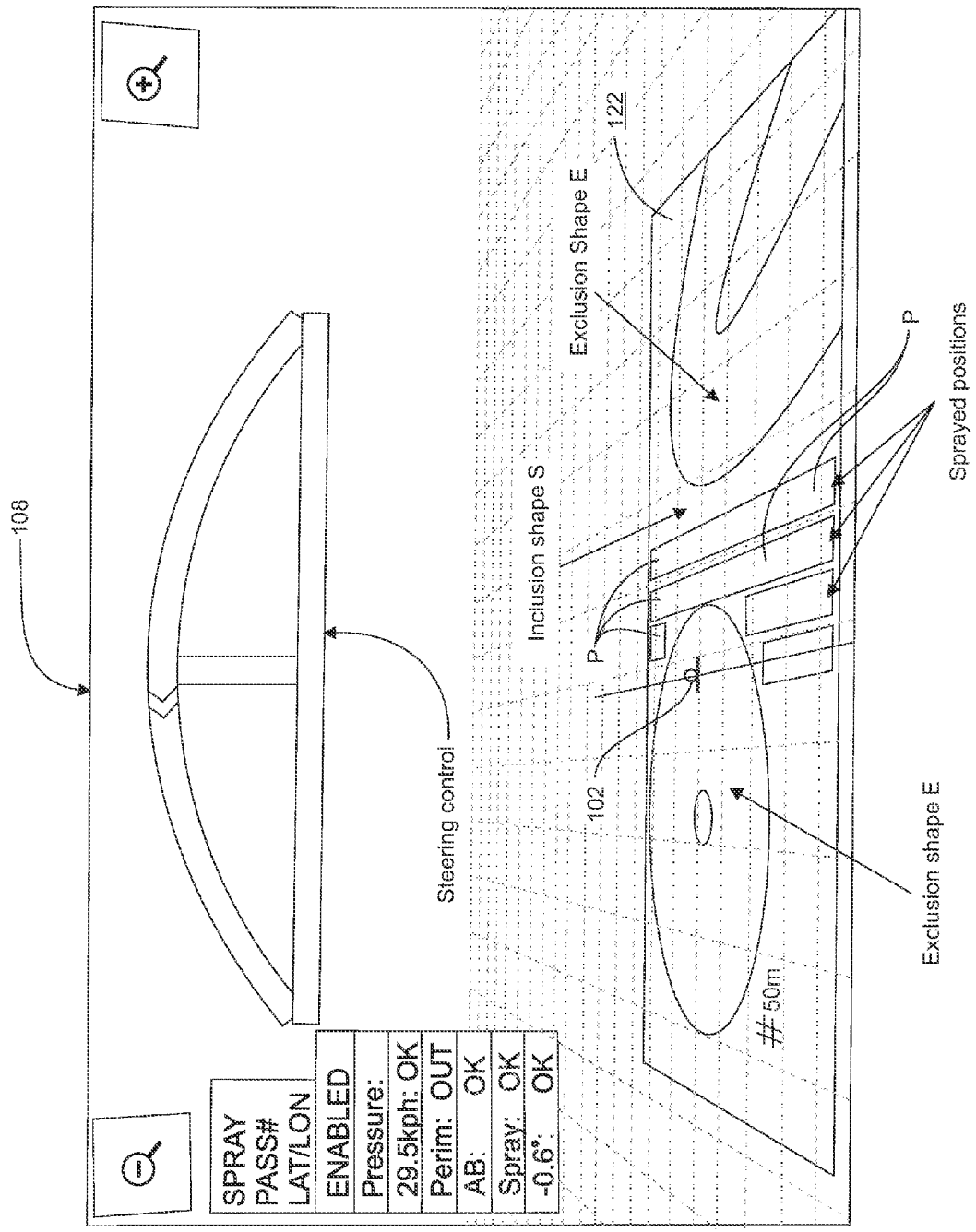
FIG. 6 is a diagram of a screenshot of the display in FIG. 1, when the system of FIG. 1 is in operation.
Figure 8A:
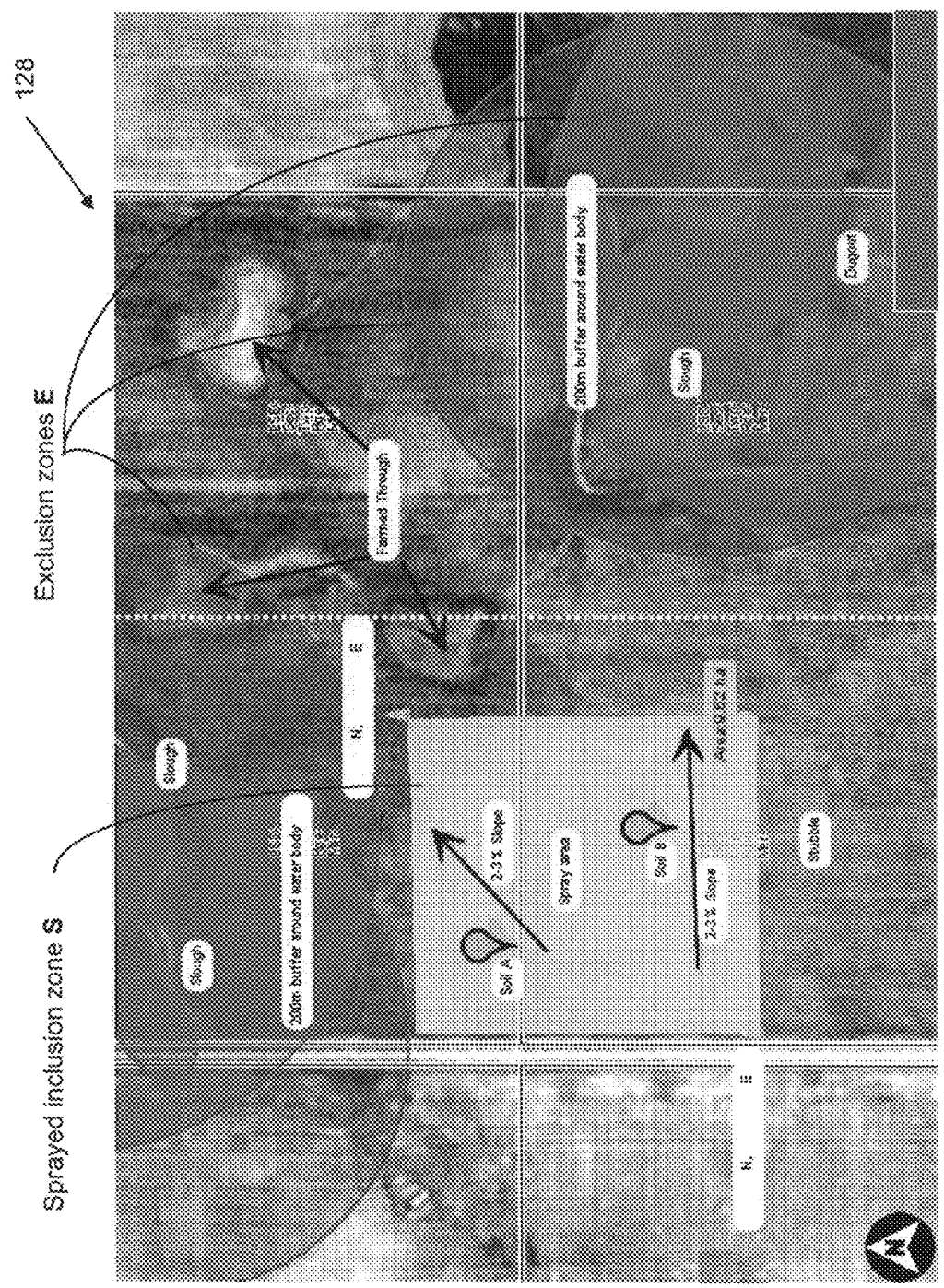
FIG. 8A is a graphical representation of inclusion and exclusion zones overlying a color photograph of a surface including mapping data.
Figure 8B:
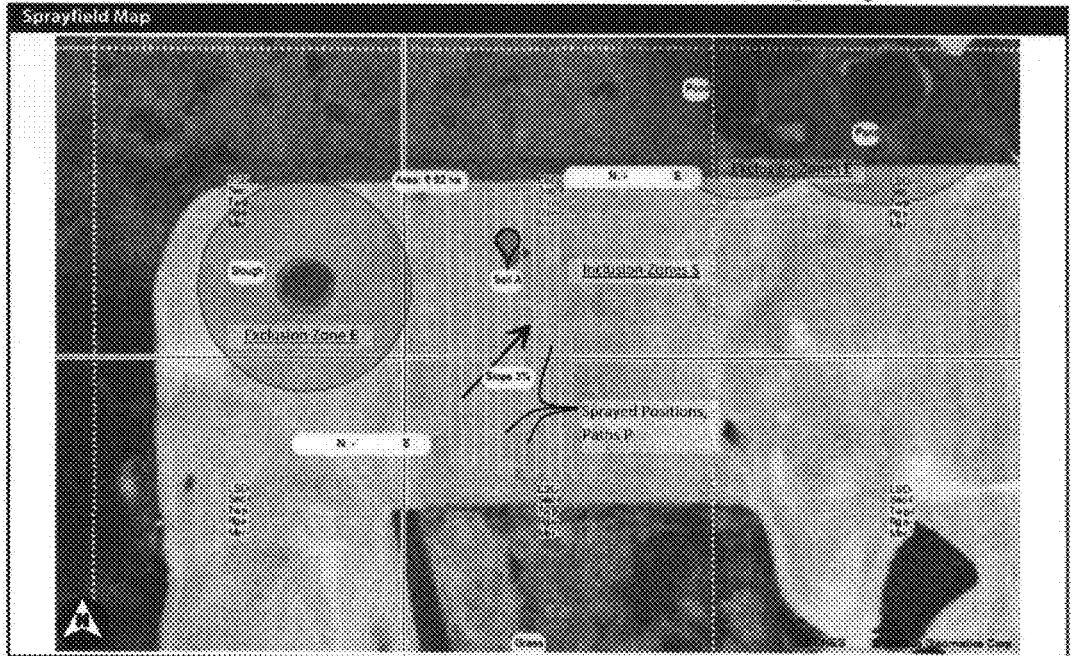
FIG. 8B is a graphical representation of mapping data and sprayed areas on a color photograph of a land surface incorporated into a report illustrating land characteristics and recorded landspraying data.

FIG. 6 illustrates a schematic representation of an annotated image integrate with steering control overlaid thereon. FIG. 8A depicts a satellite image annotated with exclusion and inclusion zones. FIG. 8B depicts a report for an example sprayed land surface having a satellite image embedded in a report format annotated with the identified exclusion zones, sprayed paths, sprayed area and various land spraying data.

The selection of a suitable land surface may depend on the net area available for disposal, and proximity to the drill site. Land surfaces situated close to the drill site often result in reduced disposal costs. Accordingly, a search for suitable land may be conducted in an ever-increasing radius starting from the drill site, the source of the waste fluids. Determination of the net area may in turn depend on the volume of waste to be disposed, the maximum allowable spray rate (or maximum fluid application rate), waste fluid chemistry and soil chemistry.

The suitability of the selected land surface may be verified by onsite inspection performed by a technician. Soil samples may be taken for analysis (See FIG. 8B) of applicable spray rates, and physical measurements using laser range finders for example, may be made to confirm the location and perimeters of exclusion zones such as bodies of water.

Once a land surface corresponding to a selected map is verified to be suitable for landspraying, the selected map 122 identifies a plurality of spatial coordinates for the surface. The map 122 may be annotated using the application software executing in the computing device 124. Shapes (e.g., polygons, circles, ovals, etc) are superimposed or overlaid to define boundaries in map 122 that correspond to zones that should not be sprayed called exclusion zones E. The technician may use the software on device 124 to apply the exclusion zone shapes to the map or a separate data file can be used which linked by the geo-coordinates or other coordinate reference for use by the control unit 106.

Figures 6A, 6B:
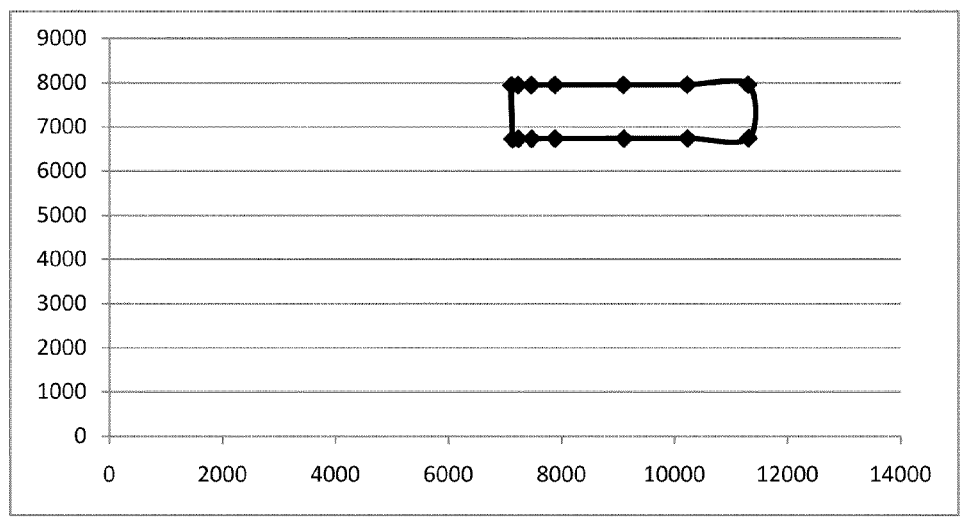
FIG. 6A is sample listing of latitude/longitude GPS coordinates provided as data defining a polygon boundary for an exclusion zone, the actual coordinates having being disguised
FIG. 6B is a plot of the exclusion zone data of FIG. 6A.

As shown in FIG. 6A, one embodiment for a subset of data that can be provided to define a zone, being an exclusion zone E or inclusion zone S, for annotation of the mapping data is being to list latitude/longitude GPS coordinates which are then in the same coordinate system as the mapping data for accurate superposition thereover. One can see, from the plot of FIG. 6B, that the data of FIG. 6A defines a generally rectangular zone. Further, the data can include whether the zone is exclusion or inclusion, the nature of the zone such as water or obstacle, job and contact details. Besides exclusion and inclusion zone data, one can include projected start, end and path data.

The remaining area of the selected map (outside of the exclusion zones) may be considered allowable or inclusion zones S that may be sprayed. Alternately, inclusion zones S may be explicitly designated and annotated on map 122. Of course, inclusion and exclusion zones S, E may be marked differently, for easy identification by devices and human operators, for example by using different colors or patterns. As shown in the color photograph portion of FIG. 8A, inclusion zone(s) S may be indicated with a yellow or green overlay and exclusion zones E in a red overlay.

Exclusion zones E can simply be boundaries to an identified area including that within a leased or rented land area. Other exclusion zones E, which are typically regulated, can include bodies of water (such as sloughs, dugouts, and ponds shown in FIGS. 8A, 8B), steeply sloped areas that could funnel or concentrate the sprayed fluid to undesirable locations and appropriate safety buffer zones from such sensitive locations. The buffers can be obtained from appropriate regulations and may be dependent on seasonal conditions. For example, under current regulations in western Canada, spraying should not occur within 100 m of a body of water in summer. In winter, that margin doubles to 200 m in part to account for reduced absorption or permeability of the ground, and the potential presence of ice. As may be appreciated, low absorption can result in a rapid runoff of fluid and into surrounding low lying areas including excluded areas or result in overconcentration of waste fluid.

Exclusion zones E may also include other sensitive locations that should not be exposed to the sprayed fluid as specified in relevant government regulations and/or by landowner request. Examples of relevant government regulations include Directive-050 published by the Energy Resources Conservation Board (ERCB) of the Government of Alberta; the Saskatchewan Drilling Waste Management Guidelines (GL99-01) from the Saskatchewan Ministry of Energy and Resources (SMER); Landspraying While Drilling (LWD) Application and Approval Guidelines from the Manitoba Petroleum Branch; and the British Columbia Oil and Gas Handbook from the Government of British Columbia.

The computing device 124 thus outputs the annotated coordinate map 126 which is partitioned into exclusion zones E where no spraying should occur and, by difference, inclusion zones S where spraying may take place.

In one embodiment, the user of computing device 124 may account for safety buffers or margins when marking the exclusion zone E. For example, to protect a pond in the winter, the corresponding exclusion zone E may be drawn to encompass the pond, as well as any point within 200 m from the edge of the pond.

In an alternate embodiment, the user of computing device 124 may simply identify a feature, draw boundaries of the exclusion zones over each feature and let the control unit 106 add the appropriate safety margins prior to opening valve 115 during operation. Such features can include transient presence of equipment, storage of crops, rock piles, well heads and the like.

In one alternate embodiment, such as in cases of missing satellite data or failure of computing device 124, an operator can physically identify exclusion zones on the ground (e.g., using pylons) to outline the boundaries or perimeters of specific land features. The control unit 106 may then be set to a recording mode, where it records current position coordinates, and sprayed position, as provided by navigation unit 118 while the vehicle 102 is driven. The operator may then drive vehicle 102, along particular desired paths while remaining well outside the pylon marked exclusion zones, simulating a spraying dry run while the control unit 106 records coordinates of the paths followed. During the dry run, the valve 115 remains closed and the container 104 may preferably be empty. Thereafter, the container 104 may be filled with waste fluid and the control unit 106 may be used to help the operator of vehicle 102 retrace the recorded path, using automated controls including the steering-assist unit 110, while spraying fluid.

The annotated coordinate map 126 may contain additional data such as slope logs, roads, pipelines, contours, and other geographic information system (GIS) layers. The coordinate system used in coordinate map 126 may be the Latitude/Longitude coordinate system used in GPS devices, the Universal Transverse Mercator (UTM) coordinate system, or another coordinate system.

The annotated coordinate map 126 may be provided to the control unit 106 on the vehicle 102 by way of a USB device attached to a USB port in interface circuit 120 of the control unit 106. Of course other interfaces such as a Bluetooth interface, serial or parallel port interface, Wi-Fi interface, an Ethernet interface or the like may be used by interface circuit 120 of the control unit 106 for I/O purposes.

Calibration

Each vehicle and/or container has different characteristics that affect the spraying operation including frame height, container volume, discharge rate, pressure and the like. Thus, to prepare the vehicle 102 for landspraying, a number of calibration and testing steps may be performed to provide appropriate vehicle-specific parameters for use by control unit 106, to determine if and when spraying should be started, continued or stopped.

For example, depending on the type of valve 115 and actuator 114 used, the signal to open or close may be sent at different times to account for varying delays (e.g., air system delays in pneumatic-actuators) in opening or closing the valve 115 as the vehicle 102 is in motion. Typical delay times of about 4 seconds from actuation have been noted for opening. When closing this time delay was approximately 2 seconds. As a result, a signal to open/close the valve 115 may be issued slightly before the moving vehicle 102 reaches a designated boundary at which it should start/stop spraying. Given a vehicle travelling at speed $V_T$, and a closing air system delay time of $T_C$, the signal to close the valve 115 may be issued at a distance of $D_{CLOSE} = V_T T_C$ before the actual boundary. Similarly, for an opening air delay time of $T_O$, the signal to open the valve may be issued at a distance of $D_{OPEN} = V_T T_O$ before the actual boundary is reached.

As noted above, hydrostatic pressure and applied air padding pressure may be used to expel fluid out of the container 104 through its duct 116. The padding pressure may be dependent on the vehicle 102 and may be set accordingly. For example, a padding pressure of about 12 psig to about 15 psig may be applied for a specific vehicle and container.

The amount of fluid volume $F_v$ discharged per unit time t, out of the duct 116 of the container 104, gives the flow rate C. The instantaneous flow rate may thus be expressed as $C = dF_v/dt$.

An average fluid flow rate may be computed by filling the container 104 with test fluid (e.g., waste fluid, water etc.) of predetermined volume $F_{V1}$ and measuring the time ti required to discharge it through the duct 116. The applied pressure during calibration should be the same pressure as that which would be used in operation. The average flow rate may then be computed as $C = F_{V1}/t1$. Alternately, as will be discussed later, a real-time measure for the instantaneous flow rate $C=dF_V/dt$ may be determined during operation.

Referring also to FIGS. 7A-7H, the spray plate 117 of nozzle 200 disperses the fluid in a fan-like shaped manner onto the land surface below with a particular spray width W. The actual spray width W, $W_1$-$W_4$ is affected by different factors including the height of the spray nozzle 200 from the ground, the dimension of the duct 116 and spray plate 117, and the applied pressure in container 104. The spray width W of the test fluid can be obtained by measuring the width of a sprayed path as the vehicle 102 traverses a path while spraying.

The pressure switch 112 may be tested and calibrated by inspecting its pressure reading just before and just after the container 104 empties its fluid contents under combined hydrostatic and applied pressure. In some embodiments, a pressure reading below 7 psig may indicate an empty or nearly empty tank or a potentially unacceptable variability in spray rate.

The navigation unit 118 provides current location coordinates for its antenna or the antenna coordinates. The antenna is typically in a front of the vehicle, adjacent the operator. However, the location of interest for spraying operations is the target or current position on the surface below and typically well-behind the vehicle. To determine the position coordinates for the target position of the spray, the relative location of the target position with respect to the antenna, which may be called the spray-to-antenna offset or spray-to-antenna setback, may be measured. The position coordinates of the target position can thus be obtained by offsetting the antenna coordinates, by the spray-to-antenna offset.

A total-antenna-offset parameter may be determined as the greater of the measured spray-to-antenna offset, and the distance traveled during the delay involved in actuating the valve 115 (i.e., $D_{OPEN}$ or $D_{CLOSE}$).

A maximum fluid areal spray rate $R_{MAX}$ may be specified in units of fluid volume per sprayed surface area (e.g., in $m^3/m^2$ or in $m^3/ha$) by a technician, after analyzing applicable regulations, agreements with the land owner, the fluid chemistry and the soil chemistry. The areal spray rate R is the rate of fluid volume $F_V$ sprayed per unit area A of the sprayed surface. The instantaneous areal spray rate may thus be expressed as $R=dF_V/dA$.

Examples of parameters which may be determined during calibration are shown in TABLE I. The measured values listed are of course only exemplary and vary from one vehicle and/or components to another.

TABLE I

| Parameter | Value | Unit |
| --- | --- | --- |
| Volume of container 104 | 19.1 | $m^3$ |
| Spray Width W | 13 | m |
| Time t to empty container | 213.6 | s |
| Delay to open valve 115, DOPEN | 4 | s |
| Delay to close valve 115, DCLOSE | 2 | s |
| Spray-to-Antenna offset | 21 | m |
| Total-Antenna-setback | 21 | m |
| RMAX | 15 | $m^3/ha$ |

To ensure that the areal spray rate R does not exceed the maximum areal spray rate $R_{MAX}$, a minimum speed for vehicle 102 can be computed, below which one cannot spray. For a vehicle travelling at speed V (in m/s), with a container having a fluid flow rate C (in $m^3/s$) and a spray width W (in m), the instantaneous areal spray rate R (in $m^3/m^2$) is:

$$R=dF_V/dA=Cdt/(WVdt)=C/(WV).$$

Thus, ensuring that $R<R_{MAX}$ requires that $V>C/(WR_{MAX})\equiv V_{min}$. The vehicle 102 must maintain a minimum speed of $V_{min}=C/(WR_{MAX})$ before spraying can start or resume, in order to ensure that the spray rate does not exceed the maximum (i.e., $R<R_{MAX}$).

Accordingly, TABLE II depicts an exemplary concordance of spray rates (or fluid application rates) and corresponding minimum vehicle velocities required, for a uniform spray width W=13 m and a fluid flow rate of C=0.09 $m^3/s$. TABLE II further includes offset distances to compensate for delays in closing the valve 115.

TABLE II

| Fluid Areal Spray Rate R ($m^3$/ha) | Speed (km/h) | Doffset to close valve (m) |
| --- | --- | --- |
| 10 | 24.76 | 14 |
| 15 | 16.51 | 9 |
| 20 | 12.38 | 7 |
| 25 | 9.91 | 6 |
| 30 | 8.25 | 5 |
| 35 | 7.07 | 4 |
| 40 | 6.19 | 4 |
| 50 | 4.95 | 3 |
| 60 | 4.13 | 3 |
| 70 | 3.54 | 2 |
| 80 | 3.1 | 2 |

Operations

After calibration, the container 104 may be filled with drilling waste fluid. Vacuum pumps may be used. Other, low cost methods of pumping fluid waste such as the use of impeller pumps are often not suitable due to debris found in drilling waste known as cuttings or shale. Impeller pumps often wear out quickly when used for pumping drilling waste.

The annotated coordinate map 126 is provided to the control unit 106, which may be accomplished via its interface circuit 120 using a USB flash memory, wired or wireless network transmission or the like.

Upon receiving the annotated coordinate map 126, the control unit 106 reads the map or otherwise obtain a digital representation of the surface to be sprayed containing coordinate data (e.g., GPS coordinates). Included therewith or in a separate data file are boundary coordinates identifying exclusion zones E in the surface which are not to be sprayed. The boundary coordinates can be vector data including polygons and the like which are geo-referenced to the geo-coordinates of the image of the surface.

The control unit 106 is used to open and close valve 115 to discharge fluid onto the target surface below, based on a set of conditions, rules, or criteria designed to avoid non-compliance.

Several modes of operation can result in non-compliance. These include spraying into the exclusion zone; spraying too much waste fluid onto an area of the surface (areal spray rate R); spraying onto steep inclines; and spraying onto areas previously sprayed (overlap). The control unit 106 is thus used to avoid non-compliance by automatically preventing any spraying at all unless all rules or criteria for spraying have been met.

Figure 4:
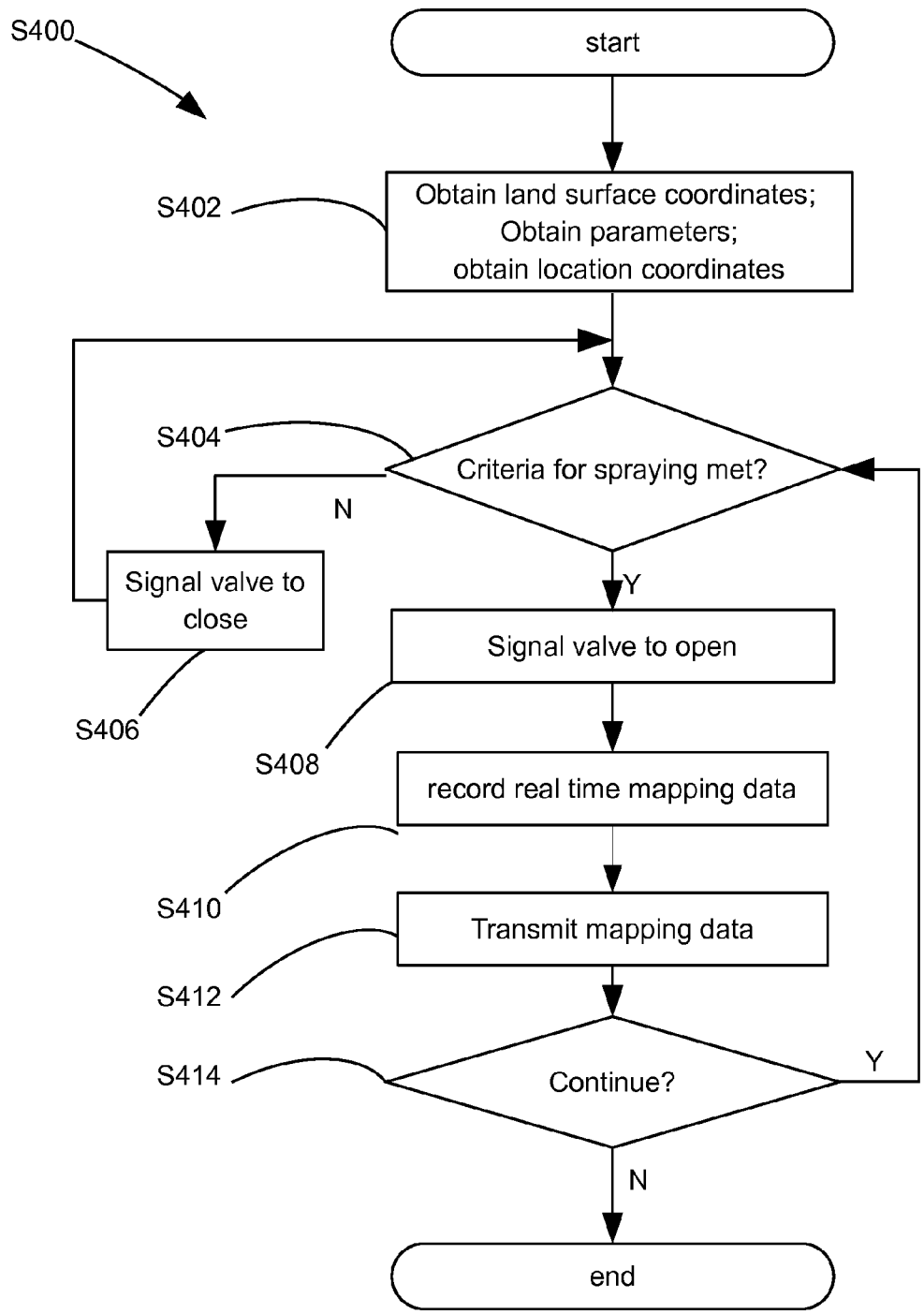
FIG. 4 is a flowchart depicting steps to operate the valve depicted in FIG. 1.

FIG. 4 depicts a flowchart of the basic steps performed by the control unit 106. Initially (step S402) the control unit 106 reads the coordinate map 126 to obtain spatial coordinates defining the land surface to be sprayed, including or accompanied by boundary coordinates identifying and defining one or more exclusion zones E.

The operator of vehicle 102 traverses at least a portion of the surface to be sprayed along a path P. As shown in FIG. 6, the path P, taking the spray width W into account, may be displayed onto the display 108 to assist the operator of the vehicle 102. Exclusion zones E, as well as the current location of the vehicle 102, may be displayed. As shown on FIG. 6, the exclusion zones E are shown as circular, or portions of circular boundaries. Additionally, the steering-assist unit 110 may be fed with corresponding data to provide assisted or automatic steering.

As the vehicle 102 traverses the surface, the control unit 106 obtains the GPS coordinates for its current position from the navigation unit 118 and further obtains threshold parameters determined during calibration to determine if the criteria for opening (or keeping open) the valve 115 are satisfied (step S404). If the conditions for opening the valve 115 are satisfied, such as avoiding exclusion zones, maintaining minimum speed to ensure spray rates less than a maximum rate, and others including sustaining minimum pressure, the control unit 106 automatically signals the valve 115 to open (step S408).

Otherwise (i.e., if any one of the specified criteria is not met) then control unit 106 automatically signals the valve 115 to close or remain closed (step S406). Criteria determination loops, keeping the valve 115 closed until such time as the criteria are satisfied. No operator input is required to open or close the valve 115. Operator error is virtually eliminated.

Each time the criteria is satisfied and spraying commences, real-time mapping of the sprayed areas can be performed (step S410). The mapping data preferably includes a record of sprayed regions and the corresponding spray rate. The mapping data may also optionally include a record of the terrain (e.g., slope). The data may be optionally transmitted (step S412) to a recipient in real-time.

If the operation is completed (step S414), the process terminates, otherwise it starts back at S402. The conditions or rules or criteria can be varied that must be satisfied prior to opening the valve 115.

Figure 5:
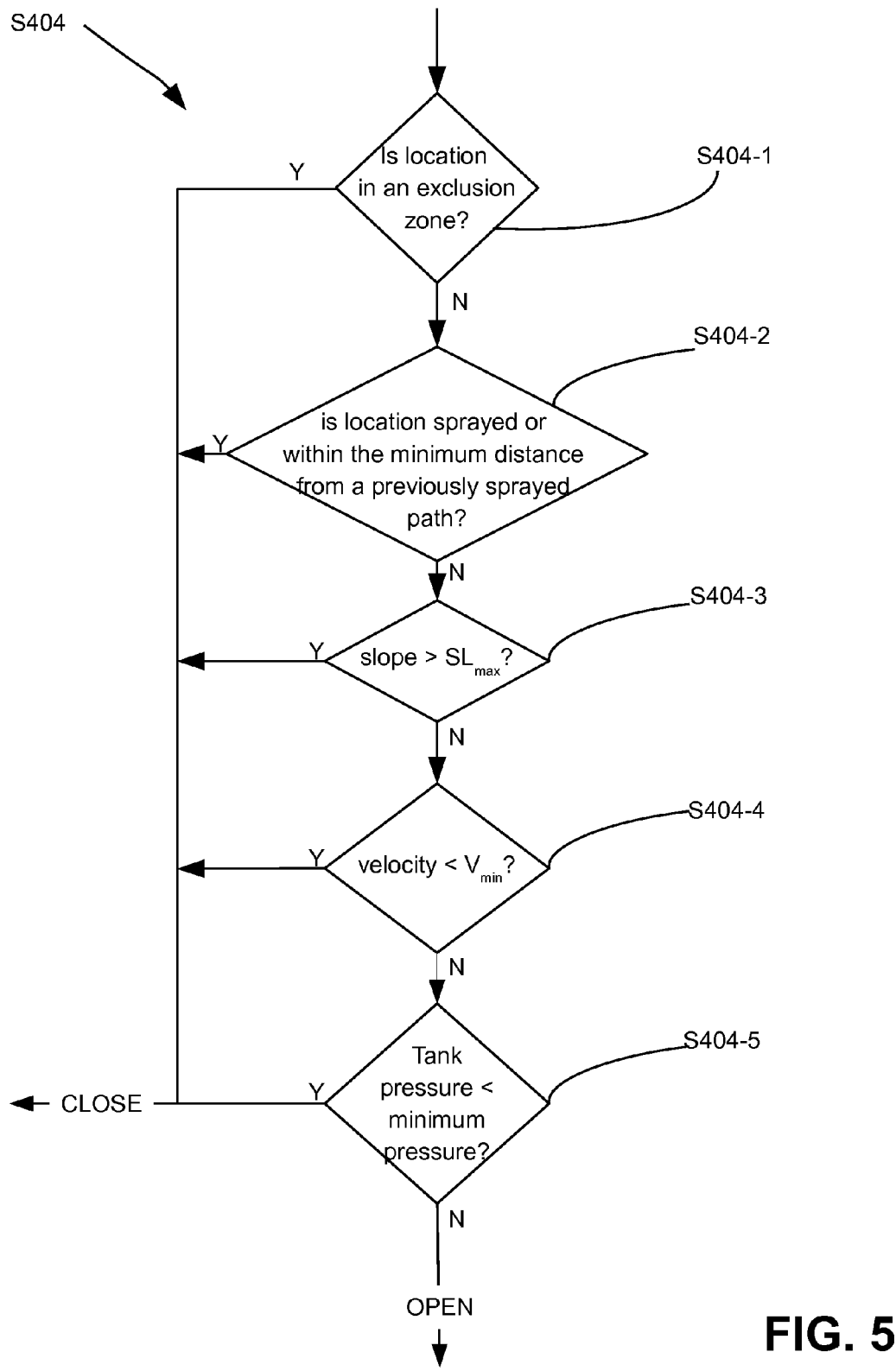
FIG. 5 is a flowchart diagram depicting a set of criteria evaluated within step S404 of FIG. 4.

FIG. 5 is a more detailed depiction of various criteria (of step S404 of FIG. 4) according to one embodiment. Having obtained current position coordinates, the control unit 106 may initially check if the current target position to be sprayed is in an exclusion zone using the supplied annotated coordinate map (step S404-1). This may be determined by comparing the current GPS coordinates of the target position (determined from the current antenna coordinates offset by the antenna-to-spray offset), to the boundary coordinates of the exclusion zones obtained by the control unit 106. If the target position is in an exclusion zone, then the criteria for opening the valve 115 are deemed not to have been satisfied.

Further, the control unit 106 may determine if the current target position has been previously sprayed. Automatic spraying only occurs if the current position is not in the record of previously sprayed positions. If the target position has already been sprayed, known from identifying previously sprayed positions in the records, then overlap would occur, the maximum areal spray rate would be exceeded and thus the criteria for spraying would not be satisfied. The control unit 106 may ensure (via steering-assist unit 110) that the target position is at least a minimum distance away (e.g., 50 cm) from a previously sprayed path. This minimizes overlaps. If the current target position is closer than a predetermined minimum distance from a previously sprayed path, or is already sprayed (step S404-2), then the criteria for spraying are not satisfied.

Otherwise the control unit 106 may further determine if the slope (i.e., the pitch or the roll) at the current target position is greater than the maximum allowed slope $SL_{max}$ (e.g., 5%) (step S404-3). If the slope is greater than the maximum limit, the criteria for spraying are not satisfied.

Otherwise, the control unit 106 may further determine if the speed of the vehicle 102 (indicating the rate of change of the target position for spraying), is above the prescribed minimum speed (step S404-4). If this speed is less than the predetermined minimum speed, then the areal spray rate (the same volume of fluid discharged onto a smaller traversed area) would exceed the maximum areal spray rate $R_{MAX}$, and thus the criteria are not satisfied. As noted above, the predetermined minimum speed is derived from to the maximum desired areal spray rate and other spray characteristics.

Otherwise the control unit 106 may further determine if the pressure in container 104 remains greater than the predetermined minimum pressure required (e.g., about 9 psi) (step S404-5) using the pressure switch 112. A pressure reading less than the predetermined minimum pressure required indicates that the tank is empty or approaching empty, and thus the criteria for spraying are not satisfied. A pressure reading less than the predetermined minimum pressure can also indicate that the spray pattern may no longer be equivalent to that which was used during calibration of minimum velocity, negatively affecting the spray rate.

If each of the required criteria are satisfied, including the pressure being above the prescribed minimum, the control unit 106 has determined that the criteria for opening the valve 115 are met and may signal the solenoid in actuator 114 to open the valve 115. Otherwise the control unit 106 has determined that the criteria for opening the valve 115 are not met and would signal the solenoid in actuator 114 to close valve 115.

Of course other embodiments may include more or less of the conditions outlined in FIG. 5. The set of conditions illustrated in FIG. 5 is only one example, of many possible permutations of criteria or rules may be evaluated by the control unit 106 to determine if the spraying should be started or stopped.

Maximum Areal Spray Rate

The actual spray rate should be monitored to ensure that it is within prescribed limits. Too high a spray rate may result in non-compliance and environmental harm. On the contrary, too low a spray rate would require a much larger land surface to be sprayed for a given amount of fluid resulting in increased disposal costs. The maximum areal spray rate $R_{MAX}$ may depend on seasonal weather conditions. For example the maximum allowed spray rate may be 40 m³/ha in summer, but only 20 m³/ha in winter. These again reflect relative fluid absorption rates of the ground under different seasonal conditions.

As above, a base or average flow rate C for a given container may be computed during calibration, obtained by dividing a known volume of fluid in the container $F_{V1}$ by amount of time $t_1$ required to discharge it. The use of an average flow rate may be adequate in operations where the flow rate C is roughly constant for the duration of the spraying operation. However, in embodiments where flow rate may vary substantially during operation, a real-time measure of the instantaneous flow rate C(t) might also be obtained.

A flow meter, such as an ultrasonic flow meter, may be used to measure the real-time flow rate C(t) as fluid is expelled through duct 116. One form of ultrasonic flow meter, also called an ultrasonic gauge, are known and some of which ultrasonic gauges use a pair of ultrasonic transducers placed outside and on opposing sides of the duct, and spaced axially. In a stationary fluid (i.e., flow rate C=0), the time taken by an ultrasonic pulse to travel diagonally from the first transducer to the second and vice versa should be the same. However, when fluid is flowing, the time taken by the ultrasonic pulse to travel diagonally along the direction of flow would be shorter than the time needed to travel diagonally against the fluid flow in the opposite direction. This difference can be used to determine the fluid flow rate (i.e., the flow rate C(t)). Unlike mechanical flow meters, ultrasonic gauges have the advantage of not interfering with the flow of fluid.

Once the real-time flow rate C(t) is known, the spray width W, the vehicle speed V(t) may be used to obtain the real-time areal spray rate R(t)=C(t)/[WV(t)]. The control unit 106 may thus limit the areal spray rate R(t)<$R_{MAX}$ by ensuring that the speed V(t)>C(t)/[WR$_{MAX}$] while spraying.

The areal spray rate R may be mapped by the control system 106. Given a real-time logs (digital samples) of the flow rate $C_i$ (from the flow meter) and the vehicle speed $V_i$ (from the speed indicator 136) at small intervals of time $\Delta t_i$. The real-time spray rate may be logged as $R_i$=[$C_i$]/[W$V_i$].

In addition to the flow rate C, the spray width W may also vary during operation depending on parameters including waste fluid and nozzle characteristics. Further, even once basic characteristics are set, additional variations can be introduced in operation due to: orientation of the spray plate 117, the height of nozzle or the spray plate 117 from the ground surface, and the tilt of container 104. The minimum speed may $V_{min}$ therefore change as the spray width W changes.

FIGS. 7A-7D depict schematic diagrams of a vehicle 102' with the nozzle for container 104', i.e., the duct 116' and spray plate 117', at its rear. The vehicle 102' may be substantially the same as the vehicle 102 of FIG. 1. FIGS. 7E-7H depict plan views of the spray from container 104' corresponding to the FIGS. 7A-7D respectively.

With reference to FIGS. 7A and 7E, in FIG. 7A the container 104' lies in a horizontal position on the vehicle's frame with its spray plate 117' oriented upwardly at a height of $H_1$ from the ground, forming an upward orientation angle $\alpha=\alpha_1$ with the horizontal plane. The arrangement in FIG. 7A corresponds to a spray width of $W_1$ depicted in FIG. 7E.

With reference to FIGS. 7B and 7F, in FIG. 7B, the container 104' is in a tilted position (indicated by the tilt angle $\beta$) with its spray plate 117' at a height of $H_1$ from the ground, tilting the spray plate 117' to form a shallower angle $\alpha_2<\alpha_1$ with the horizontal plane. The arrangement in FIG. 7B corresponds to a spray width of $W_2$ depicted in FIG. 7F.

With reference to FIGS. 7C and 7G, in FIG. 7C, the container 104' is in a horizontal position as in FIG. 7A but the spray plate 117' is oriented downwardly to form an angle $\alpha_3$ below the horizontal plane. The arrangement in FIG. 7C corresponds to a smaller spray width of $W_3$ depicted in FIG. 7G.

With reference to FIGS. 7D and 7H, in FIG. 7D, container 104' is again in a horizontal position as in FIG. 7A and is once again positioned to form an angle $\alpha_1$ with the horizontal plane. However, the container 104' is loaded on a lower truck frame, and the spray plate 117' is at a lower height of $H_2<H_1$. The arrangement in FIG. 7D may thus correspond to a spray width of $W_4$ depicted in FIG. 7H.

As shown in FIGS. 7E-7H, the spray width W may depend on the orientation angle $\alpha$ of the spray plate 117' and the height h of the spray plate 117' from the ground. Additionally the spray width may depend on the tilt angle $\beta$ of container 104' as shown in FIG. 7B. The spray width may thus be described as a multivariable function $W=W(\alpha,h,\beta)$.

The spray width dependence on $\alpha$, h, $\beta$ may be described as a table of values determined during calibration. The calibrated values may be used to compute an accurate spray rate. For example, as the spray width is reduced from $W_1$ to $W_2$, it is necessary to increase the minimum speed $V_{min}$ of vehicle 102' (from $C/[W_1R_{MAX}]$ to $C/[W_2R_{MAX}]$), in order to ensure that maximum areal spray rate $R_{MAX}$ is not exceeded.

In alternate embodiments, it may be desirable to increase the efficiency of spraying—i.e., increase the areal spray rate R as close to the maximum rate $R_{MAX}$ as possible without exceeding $R_{MAX}$. Accordingly, the control 106 with possible use of steering-assist unit 110 may decrease the speed of vehicle 102, in response to either a reduced flow rate or an increased spray width, to boost spraying efficiency while maintaining a compliant spray rate below the maximum spray rate.

Overlap

As noted above and generally, overlap of spraying is avoided (step S404-2) on those parts of the land surface designated for spraying. In contrast to agricultural applications (e.g. fertilizer spraying), overlaps are avoided for drill waste disposal and missed areas are tolerated. Overlaps generally lead to spray rates that may exceed the maximum spray rate limits set by regulations.

The control unit 106 takes the spray width into account, when monitoring the path P traversed by the vehicle 102, so as to avoid overlaps when encountering or approaching previously sprayed positions. To avoid overlaps, a clearance gap between the region defined by the periphery of the current path and a previously sprayed strip (or region or pass) of the path should be non-zero. For example, in some embodiments, a 50 cm clearance gap is a good practical separation. As shown in FIG. 6, sprayed regions may be displayed on the display 108 for the benefit of the operator of vehicle 102.

When the vehicle 102 approaches the perimeter of an inclusion zone S at an angle, (i.e., diagonally), one end/edge of the sprayed area approaches an already sprayed strip or path P earlier than the opposite end/edge of the sprayed area. In this case, the control unit 106 signals the valve 115 to close to avoid overlap from either end of the spray width. Similar problems are known in the agricultural industry, and are typically solved using precision agricultural guidance technologies, employing section and boom controls to reduce or eliminate overlap spraying that may result when the angle of vehicle approach is less than 90°. In embodiments of the present invention, overlaps are completely eliminated.

Sloped Terrain

As noted in step S404-3 of FIG. 5, control unit 106 avoids spraying on sloped surfaces or inclines that have a rise to run ratio of greater than a predetermined maximum $SL_{max}$. Steep slopes risk run off and localized concentration and an equivalent areal spray rate greater than the maximum. This maximum slope may be expressed as an angle using simple trigonometry, $|\tan^{-1}(SL_{max})|$. Thus a maximum rise over run slope value of $SL_{max}=5\%$ corresponds to a maximum magnitude of about $\tan^{-1}(0.05)\approx 2.86°$ for both the roll angle $\phi$ and the pitch angle $\theta$.

Slope data can be provided by slope measurement unit 134. The slope measurement unit 134 may include one or more inclinometers, and/or accelerometers. Independent measurements of both the roll angle $\phi$ and the pitch angle $\theta$ of vehicle 102 may be obtained from the slope measurement unit 134. Commercial systems exist for measuring the pitch and roll of vehicles.

The control unit 106 will thus signal a cessation of spraying (i.e., closes valve 115) if either of the roll or pitch measurements indicate an incline greater than the maximum allowed slope. That is, no spraying should take place unless both the roll and pitch are less than the maximum slope allowed.

Slope measurement unit 134 may also be implemented as a modified steering-assist unit. Algorithms used in steering-assist can be modified to detect steep slopes. Auto-steer technology uses a measure of the vehicle roll, to compensate by steering in the opposite direction to ensure a straight vehicle path on hilly terrain. By slightly modifying the algorithm used for steering-assist, roll measure data may be converted to slope data.

In one embodiment, for simplicity or economy, only one inclinometer might be provided providing one of either the pitch angle θ or roll measurement φ. When there is only one measurement available, such as pitch, the other measurement, roll φ, may also be assumed not to exceed the maximum allowed slope. This is a reasonable simplification as avoidance of rollover ensures that vehicle 102 is also always driven at a low roll angles, well within the maximum slope allowed.

In yet other embodiments, where a topographical map is used as input map 122, then slope measurement unit 134 may not be required. As may be appreciated, topographical maps contain contour date that identify contiguous positions having the same altitude. This allows slope data to be determined by computation using simple trigonometry. For example, the pitch angle θ at a given position may be computed as $\theta = \tan^{-1}(\Delta y/\Delta x)$ where $\Delta y$ is the altitude difference between the closest two contour lines and $\Delta x$ is the horizontal distance between them along the direction of travel. Accordingly, a separate hardware slope measurement unit such as slope measurement unit 134 need not be present. The computation of slope data from contours may be performed by computing device 124 or control unit 106. Alternately, the slope measurement unit 134, if present, may be used by control unit 106 to verify computed slope data.

Remote Monitoring

The control unit 106 may record or map various data including vehicle location, vehicle speed, spray rate, and the like in mapping data file 128. A record actual spray rates and locations where fluids are applied can be used to demonstrate compliance with applicable regulations, and commercial agreements with landowners.

As noted above, upon receiving a signal from pressure switch 112, the control unit 106 determines that there is little or no fluid left to spray, regardless of the status of valve 115. This helps prevent areas from being erroneously logged as having been sprayed, when the container is empty even if the valve 115 may be open.

The control unit 106 may store its real-time mapping data file 128 locally, or provide it to a remote computing device for real-time monitoring (see S412 in FIG. 5).

Accordingly, one alternate embodiment of system 100 may include a wireless data communication antenna (e.g., Wi-Fi antenna, Bluetooth antenna) attached to a wireless port in interface circuit 120. The control unit 106 may thus transmit real-time mapping data to a remote computer located at a remote site using the data communication antenna. Real time mapping data may be encapsulated and transmitted as extensible mark-up language (XML) data, using web-services or using proprietary formats and network transport protocols. Further, alerts can be transmitted including that the system was bypassed alerting the need for system troubleshooting.

In one specific embodiment, a nearby gateway device such as a wireless router or a nearby computer, in wireless communication with control unit 106, may receive real-time mapping data and retransmit it to across a wide area network 130 such as the Internet, to a remote monitoring device, via a modem such as a cable modem, a DSL modem, ISDN modem, a dial-up modem, satellite modem or the like.

In a variation of the above embodiment, the control unit 106 may optionally receive control commands and data (e.g., in XML format) sent from a remote computer. Control unit 106 may interpret control commands and parameter data, and locally execute the commands (e.g., to stop spraying altogether, to change a particular threshold parameter value, to update a map, etc). Such capabilities may be used to remotely override spraying operations in case of an emergency; or to update a few parameters on an already calibrated vehicle.

The system 100 may be used to compile reports as required by applicable regulations. The mapping data file 128 may include graphical reports on sprayed surfaces as depicted in FIG. 8. In addition, a concordance of spray rates and slope data may be provided along with the graphical representation. A final map of activity depicting detailed information interspersed within the photographic map (e.g., satellite image) of the land surface sprayed may be produced by device 124 as depicted in FIG. 8B. The information may include, for example, waste generator licensee, unique drilling location identifier, surface location of the waste generating site, well license number, name of technician, the disposal location, the ground and/or soil condition, the type of land, landowner information, source water chemistry, source water location, soil sample data, GPS coordinates and drilling waste, soil and source water salinities/chemistry, owner information, various compliance flags, and the like.

In addition to the final map of activity, the computing device 124 may also compile detailed reports on fluid waste chemistry's, analyse loading rates, total analyse loads, calculated spray rates, and all other data applicable for regulatory compliance and good record keeping practices. Customized reports may be generated for internal purposes landowners, clients, regulatory agencies and the like.

Kit

In one alternative embodiment of the present invention, components for retrofitting a vehicle may be provided in kit form. A kit can be provided to reliably and conveniently retrofit a vacuum truck so that it can be used for landspraying. The vacuum truck may already have container with a pneumatically actuated discharge valve (similar to valve 115 coupled to cylinder 114B), or will be fitted with one as required herein.

A typical vacuum truck will have a remote-actuated on-off (open-closed) dump valve. A kit will interject into the on/off control for the existing dump valve, or it absent, provide a valve, duct and nozzle. Accordingly, a typical kit for retrofitting a vehicle for use in landspraying, may include provision of control unit 106, and navigation unit 118 and an automation or kit interface to enable both controlled landspraying pursuant to embodiments disclosed herein, and manual operation according to the original uses of the vehicle.

The control unit 106 can include the touch-screen display 108. The navigation unit 118 may include an antenna, an antenna cable for interconnecting the antenna to the unit, and an antenna mount (e.g., magnetic mount). The kit may also include various connection hardware including a plurality of pipes such as plastic air lines, and a variety of fittings or interconnects. The fittings may include push-in and/or threaded connects.

The kit may also include some or all of the actuator assembly 114 including the solenoid-piloted actuator 114A and the shuttle valve 114D. The kit may also include the fluid pressure switch 112 and relay 142. If not already supplied on the vehicle, or unsuitable for integration, the air toggle switch 114C is also provided.

The kit may additionally include a weather proof box for housing the assembled components; a breather vent; and a plurality of framing nuts. The kit may include relay 144, a relay cable, the lockable override switch 152, LED 148 and circuit breaker 154. The kit may also include a variety of electrical connection conveniences including a relay harness, a strain relief, a plurality of crimp and shrink ring connectors and a terminal block.

The kit may further include an adapter and actuator connector between the actuator 114 and valve 115.

The kit may further include a vehicle-specific steering-assist unit 110 and a cable for interconnecting steering-assist unit 110 to the control unit 106.

In some embodiments, a basic kit may be provided without control unit 106 and display 108. Accordingly, a vacuum truck retrofitted using the smaller kit without the control unit 106 and the display 108, may be operated in manners exemplary of the present invention by temporarily acquiring a tablet device, such as hardware unit 138 that includes both control unit 106 and display 108, by way of a lease or rental arrangement.

As noted, the retrofitted truck may contain a discharge valve like valve 115 with an actuating mechanism similar to double-acting cylinder 114B. If not, in some embodiments, the cylinder 114B and the valve 115 may be included in the kit, to adapt a container for landspraying use. A nozzle, such as in the form of a standardized duct 116 and spray plate 117, may also be included in the kit. Standardization can assist in simplifying calibration and range of control issues. Yet other embodiments may also provide the container 104, and air supply unit 150 to upgrade an ordinary truck for landspraying use.

The components in the kit, of course, are only exemplary and in no way limiting. In alternate embodiments, the kit may use hydraulic actuators or electric actuators and/or pneumatic actuators to actuate the valve.

The memory 107 of the control unit 106 may be preloaded with processor-executable instructions adapting the control unit 106 to operate as described herein for automatic control of the spraying operation of system 100.

Alternately, the kit may include firmware on a processor readable medium such as a USB memory stick, for loading into memory 107.

In addition, the kit may include an application software program, provided on a processor readable medium such as a CD, DVD, flash memory, USB memory stick or the like. The application program contains a set of processor-executable instructions for loading to a generic computing device (such as device 124). The set of instructions adapt the computing device to accept an input map representative of a surface to be sprayed, and to outline exclusion zones on the input map, to form an annotated coordinate map for use by the control unit 106. Installation and use instructions for the software may also be provided on the CD or optionally as a booklet.

As may now be appreciated, embodiments disclosed herein provide a robust regulatory compliance management system and an accurate drill waste fluid disposal data collection. Powerful mapping functions and controls automate much of the process involved in landspraying and reporting, thereby reducing human error. Reliable data can be provided to various stakeholders including governments, residents, land owners and businesses in the extractive industries involved in the disposal of drilling waste.

Reducing human error may lead to significant economic benefit. The cost of non-compliance can range from about $5,000 CDN to more than $25,000 CDN per failure in follow up assessments, reclamation efforts and possible monetary fines. With about 20,000 qualifying wells drilled yearly in Alberta, Canada alone and, as applicant understands it, at an projected rate of 12% of disposals being at high risk, that is over 2000 potential case of non-compliance annually.

Further advantages include improvement to the health and safety of drivers and protection of communities where waste fluid is sprayed. Driving safety is improved due to the visual guidance provided in on display 108, which could greatly aid night time driving. Furthermore, steering-assist unit 110 provides additional assurance against potentially unsafe excursions, overlaps and non-compliance events.

As may be recalled, conventional methods involve physically marking exclusion and/or inclusion zones with pylons and instructing operators to remain outside of exclusion zones during the spraying operation. Preparation and subsequent operations under these conditions contributes to driver fatigue and generally increases stress associated with operating the vehicle.

In contrast, embodiments disclosed herein reduce fatigue and stress by allowing the operators of vehicle 102 to concentrate primarily on driving. The spraying operation is automatically controlled by the system and the operator is relieved from tasks associated with starting and stopping spraying operations, looking for pylons and other markers and the like. Moreover, steering-assist unit 110 may help avoid collisions and accidental incursions into excluded zones.

Although embodiments discussed above involve the use of land vehicles, other embodiments of the present invention may be adapted for use in aircraft and other traversing vehicles. An aircraft quipped with a navigation system, may carry a fluid filled container to spray a land surface at low altitudes. For example embodiments of the present invention may be used to dispense pesticides, or combat forest fires from helicopters. Embodiments of the present invention may also have maritime applications. The fluid container may be carried by a vessel. Examples of maritime application may include spraying oil dispersants into oceans after accidental oil spills during transport or offshore exploration. Further, municipalities may use it for mapping bio-solids application to farmland, application of oil, calcium chloride, or other amendments to public roads and so forth, tracking rates and mapping applied areas. Intensive livestock operations could also use the product to map the application of manure and so forth which, in the case of the hog industry, also use similar vacuum-type vehicles to convey and spray liquid manures.

Using embodiment herein result in fewer non-compliance events and any occasional events of non-compliance are recorded and documented for ease of identification and remedy. This reduces the amount of effort related to investigations of non-compliance.

We claim:

1. A method for controlled spraying of a surface with fluid from a mobile container, the method comprising:
   obtaining a plurality of spatial coordinates for the surface;
   establishing boundary coordinates within the spatial coordinates defining one or more exclusion zones on the surface which are not to be sprayed;
   providing an on-off spray nozzle having a fully open position for spraying fluid at a spray width W and a flow rate C in units of volume per time from the container, and a fully closed position to stop spraying;
   traversing at least a portion of the surface with the container along a path, and
   for each current position of the container along the path:
      obtaining position coordinates;
      determining a speed V for the rate of change of the current position,
      computing the areal spray rate as $R=C/(WV)$, and automatically switching the spray nozzle from the fully closed position to the fully open position for spraying fluid width W at flow rate C if the following spray conditions are met, including
the spray width W is outside the exclusion zones, and
the areal spray rate R is less than a predetermined maximum spray rate $R_{MAX}$.

2. The method of claim 1 wherein overlaps of the path are avoided, further comprising:
maintaining a record of previously sprayed positions that have already been automatically sprayed; and
automatically spraying only if an additional spraying condition is met, including, the current position is not in the record as a previously sprayed position.

3. The method of claim 2 wherein while traversing the path and upon encountering any of the previously sprayed positions, further comprising spraying only if the current position is further than a predetermined minimum distance away from the nearest one of the encountered previously spayed positions.

4. The method of claim 1, further comprising:
determining a minimum speed $V_{min}$ associated with the predetermined maximum areal spray rate $R_{MAX}$ as $V_{min}=C/(WR_{MAX})$, and
wherein performing the automatically spraying step only if $V < V_{min}$.

5. The method of claim 1, wherein determining the flow rate C comprises:
calibrating the spray nozzle by
discharging a known volume $F_{v1}$ of fluid from the container;
measuring the duration $t_1$ required to discharge the volume $F_{v1}$ of fluid; and
computing the flow rate as $C=F_{v1/t1}$.

6. The method of claim 1, further comprising:
measuring pressure in the container; and
automatically spraying only if an additional spraying condition is met, including, the measured pressure is above a predetermined minimum pressure.

7. The method of claim 1, further comprising:
obtaining the slope of the surface at the current position; and
automatically spraying only if an additional spraying condition is met, including, the slope is below a predetermined maximum slope.

8. The method of claim 1 wherein:
the fluid is a waste fluid comprising solid particle debris; and
the opening of the on-off spray nozzle from the fully closed position to the fully open position for spraying fluid at a flow rate C comprises, fully opening a valve for passing the waste fluid including the solid particle debris.

9. The method of claim 1, further comprising: pressurizing the container by maintaining an air pad therein for lessening variability in a hydrostatic head of the fluid in the container while spraying.

10. Apparatus for spraying controlled spraying of a surface to be sprayed with fluid from a mobile container, comprising:
a navigation unit for determining at least a current position of the mobile container;
a speed indicator for determining a speed V of the mobile container;
an on-off valve for a spray nozzle, the on-off valve having a fully open position for spraying fluid through the spray nozzle at a spray width W and a flow rate C in units of volume per time from the mobile container, and a fully closed position to stop spraying;
an actuator interconnected to the valve for alternately controlling the valve between the fully open position and fully closed position; and
a control unit coupled to the navigation unit, the speed indicator and the actuator for:
receiving the current position data from the navigation unit and the speed V data from the speed indicator;
determining whether the spray width W at the current position is outside one or more exclusion zones on the surface which are not to be sprayed;
determining a minimum speed $V_{min}$ for the vehicle mobile container for spraying an areal spray rate $R=C/(WV)$ less than a predetermined maximum spray rate $R_{MAX}$; and
automatically signalling the actuator to open the on-off valve from the fully closed to the fully open position to deliver spray fluid only if the current position is outside the exclusion zone and the speed is greater than or equal to the minimum speed $V_{min}$.

11. The apparatus of claim 10, further comprising a flow meter for determining the fluid flow rate C from the mobile container, the flow meter being in communication with the control unit for determining the minimum speed $V_{min}$.

12. The apparatus of claim 11, wherein the flow meter is an ultrasonic flow meter.

13. The apparatus of claim 10, wherein the processor-executable instructions further comprises a processor-readable medium for identifying and storing sprayed positions in a record on the processor-readable medium and wherein the processor-executable instructions only automatically signal the actuator controllably deliver spray fluid if the current position is not in the record of sprayed positions.

14. The apparatus of claim 13, wherein the current position is not in the record of sprayed positions, the processor-executable instructions signal the actuator to open only if the current position is further than a predetermined minimum distance away from any of the sprayed positions in the record.

15. The apparatus of claim 10, wherein the processor-executable instructions further comprise a processor-readable medium recording a real-time log of the areal spray rate $R=C/(WV)$.

16. The apparatus of claim 10, further comprising a steering-assist unit coupled to the mobile container and the control unit, wherein the processor-executable instructions further adapt the control unit to vary the speed of the mobile container to V' in response to a varied flow rate C' while still maintaining that $V'>C'/(WR_{MAX})$ to ensure that a new area spray rate $R'=C'/(WV')$ remains below the predetermined maximum rate $R_{MAX}$.

17. The apparatus of claim 10, further comprising a pressure switch in the container providing pressure data inside the container, wherein the processor-executable instructions further adapt the control unit to signal the actuator to close the valve while the pressure data is below a predetermined minimum pressure.

18. The apparatus of claim 10, further comprising a slope measurement unit for the mobile container providing slope at the target position, wherein the processor-executable instructions further adapt the control unit to signal the actuator to open the valve only if the slope is below a predetermined maximum slope.

19. The apparatus of claim 10, wherein the actuator comprises one of a pneumatic actuator, a hydraulic actuator and an electric actuator.

20. The apparatus of claim 19, wherein the actuator comprises a solenoid-piloted actuator.

21. The apparatus of claim 10, wherein the actuator comprises a solenoid-piloted pneumatic actuator for opening and closing the valve, the solenoid-piloted actuator electrically coupled to the control unit for receiving the signalling from the control unit to alternately open the valve, and close the valve.

22. The apparatus of claim 21, wherein the actuator further comprises:
   an air toggle switch having a first output connected to the valve to open the valve and a second output connected to the valve to close the valve; and
   a shuttle valve connected between the second output and the valve an connected between the solenoid-piloted pneumatic actuator and the valve; and
   wherein the solenoid-piloted pneumatic actuator receives the signalling from the control unit to alternately
      direct air to the air toggle switch for opening the valve, and
      direct air to the shuttle valve to close the valve.

23. The apparatus of claim 10 wherein said control unit further comprises a processor and a memory storing processor-executable instructions; said processor executes the processor-executable instructions stored in said memory for
   receiving data from the navigation unit and the speed indicator;
   determining whether the spray width W at the current position is outside the exclusion zones;
   determining the minimum speed $V_{min}$; and
   automatically signalling the actuator to open or close the valve.

24. A kit for retrofitting a vehicle for use in spraying fluid onto a surface, said vehicle having a container mounted thereon, the container having a valve to control fluid discharge, said kit comprising:
   an actuator assembly connectable to the valve for on-off control of the valve;
   a navigation unit; and
   a control unit comprising: a processor in communication with memory, the navigation unit, and the actuator assembly; and memory storing processor-executable instructions adapting the control unit to:
      obtain a plurality of coordinates of the surface including boundary coordinates defining exclusion zones which are not to be sprayed;
      determine position coordinates for a spraying target position on the surface from the navigation unit;
      determine whether the target position is outside the exclusion zones by comparing the position coordinates with the boundary coordinates;
      obtain a spray width W, a flow rate C, and a predetermined maximum spray rate $R_{MAX}$ for fluid sprayed from the container, to determine a minimum speed $V_{min}=C/(WR_{MAX})$ for the vehicle; and
      automatically signal the actuator assembly to open the valve to the fully open position only if the target position is outside the exclusion zone and the current vehicle speed V is greater than or equal to $V_{min}$; and otherwise signal the actuator to fully close the valve.

25. The kit of claim 24, wherein the actuator assembly comprises a solenoid-piloted pneumatic actuator for opening and closing the valve, the solenoid-piloted actuator electrically coupled to the control unit for receiving the signalling from the control unit to alternately open the valve, and close the valve.

26. The kit of claim 25, wherein the actuator assembly further comprises:
   an air toggle switch having a first output connected to the valve to open the valve and a second output connected to the valve to close the valve; and
   a shuttle valve connected between the second output and the valve an connected between the solenoid-piloted pneumatic actuator and the valve; and
   wherein the solenoid-piloted pneumatic actuator receives the signalling from the control unit to alternately
      direct air to the air toggle switch for opening the valve, and
      direct air to the shuttle valve to close the valve.

27. The kit of claim 24, further comprising a relief valve to maintain pressure in the container below a predetermined maximum pressure.

28. A control unit for controlling spraying of fluid from a mobile container to a surface, said control unit comprising:
   a processor;
   an interface circuit coupled to the processor, providing interconnections to a navigation unit, and an actuator for an on-off valve controlling spraying from the mobile container; and
   memory in communication with said processor, storing processor-executable instructions adapting said processor to:
      obtain a plurality of coordinates of the surface including boundary coordinates defining exclusion zones which are not to be sprayed;
      determine position coordinates for a spraying target position on the surface from the navigation unit;
      determine whether the target position is outside the exclusion zones by comparing the position coordinates with the boundary coordinates;
      obtain a spray width W, a flow rate C, and a predetermined maximum spray rate $R_{MAX}$ for fluid sprayed from the mobile container when the valve is fully open, so as to determine a minimum speed $V_{min}=C/(WR_{MAX})$ for the mobile container; and
      automatically signal the actuator to fully open the valve only if the target position is outside the exclusion zone and the current speed V of the mobile container is greater than or equal to $V_{min}$; and otherwise signal the actuator to fully close the valve.

29. A system for spraying fluid from a container on a vehicle onto a surface, comprising:
   a database of maps representative of surfaces available for spraying;
   a computing device interconnected to the database, the computing device having a processor and a processor readable medium storing a set of processor-executable instructions adapting the computing device to:
      select a map from the database; and
      annotate the map from the database to form an annotated map having exclusion zones in the surface, not to be sprayed;
   a speed indicator providing the speed V of the vehicle;
   a navigation unit providing a current location of the vehicle;
   an actuator coupled to a discharge valve on said container; and
   a control unit having a second processor in communication with the navigation unit, the actuator and memory storing a second set of processor-executable instructions adapting the control unit to:

obtain a plurality of coordinates of the surface from the annotated map including boundary coordinates for the exclusion zones;

determine position coordinates for a spraying target position on the surface from the navigation unit;

determine whether the target position is outside the exclusion zones by comparing the position coordinates with the boundary coordinates;

obtain a spray width W, a flow rate C, and a predetermined maximum spray rate $R_{MAX}$ for fluid sprayed from the container, to determine a minimum speed $V_{min}=C/(WR_{MAX})$ for the vehicle; and automatically signal the actuator to open the valve only if the target position is outside the exclusion zone and $V \geq V_{min}$; and otherwise signal the actuator to close the valve.

30. The system of claim 29, wherein the second set of processor-executable instructions further adapt the control unit to maintain a record of all sprayed positions, and signal the actuator to open the valve only if the target position is not in the record.

31. The system of claim 30, wherein the second set of processor-executable instructions further adapt the control unit to record spray rate data computed as $R=C/(WV)$ for the each position sprayed.

32. The system of claim 29, further comprising a second computing device adapted to receive wireless data; a wireless communication antenna interconnecting the control unit; the second set of processor-executable instructions further adapting the control unit to transmit the spray rate data recorded to the second computing device using the data communication antenna.

33. The system of claim 32, wherein the database of maps is stored on the computer device.

34. The system of claim 33, further comprising a third computing device, storing the database of maps.

35. A non-transatory computer readable medium storing processor-executable instructions for loading into a memory of a control unit, for use in spraying a surface with fluid from a container mounted on a vehicle, the control unit having a processor in communication with a navigation unit, an actuator actuating a discharge valve in the container and the memory, the instructions adapting the control unit to:

obtain a plurality of coordinates of the surface including boundary coordinates for one or more exclusion zones;

determine position coordinates for a spraying target position on the surface, from the navigation unit;

determine whether the target position is outside the one or more exclusion zones by comparing the position coordinates with the boundary coordinates;

obtain a spray width W, a flow rate C, and a predetermined maximum spray rate $R_{max}$ for fluid sprayed from the container when the discharge valve is in a fully open position, to determine a minimum speed $V_{min}=C/(WR_{max})$ for the vehicle; and automatically signal the actuator to open the discharge valve to the fully open position only if the target position is outside the one or more exclusion zones and the current vehicle speed $\geq V_{min}$; and otherwise signal the actuator to close the valve to a fully closed position.

* * * * *